United States Patent
Pjanic et al.

(10) Patent No.: US 9,497,356 B1
(45) Date of Patent: Nov. 15, 2016

(54) COLOR REPRODUCTION, PATTERN HIDING AND IMAGE ALTERNATIONS WITH HALFTONE PRINTS ON METAL

(71) Applicant: Roger D. Hersch, Epalinges (CH)

(72) Inventors: Petar Pjanic, Chavannes-près-Renens (CH); Roger D. Hersch, Epalinges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 14/747,184

(22) Filed: Jun. 23, 2015

(51) Int. Cl.
| | |
|---|---|
| H04N 1/60 | (2006.01) |
| H04N 1/52 | (2006.01) |
| B42D 25/30 | (2014.01) |
| B42D 25/36 | (2014.01) |
| B42D 25/378 | (2014.01) |
| G06K 15/02 | (2006.01) |
| H04N 1/32 | (2006.01) |
| B41M 3/14 | (2006.01) |
| B41M 1/18 | (2006.01) |
| B41M 1/22 | (2006.01) |

(52) U.S. Cl.
CPC ............ *H04N 1/6088* (2013.01); *B42D 25/30* (2014.10); *B42D 25/36* (2014.10); *B42D 25/378* (2014.10); *G06K 15/1878* (2013.01); *G06K 15/1881* (2013.01); *H04N 1/32144* (2013.01); *H04N 1/32256* (2013.01); *H04N 1/32309* (2013.01); *H04N 1/52* (2013.01); *H04N 1/6016* (2013.01); *H04N 1/6019* (2013.01); *H04N 1/6022* (2013.01); *H04N 1/6058* (2013.01); *H04N 1/6097* (2013.01); *B41M 1/18* (2013.01); *B41M 1/22* (2013.01); *B41M 3/148* (2013.01); *B42D 2033/10* (2013.01)

(58) Field of Classification Search
None
See application file for complete search history.

(56) References Cited

U.S. PATENT DOCUMENTS

| | | | | |
|---|---|---|---|---|
| 6,023,525 A | * | 2/2000 | Cass | .................... G06K 9/4652 |
| | | | | 382/162 |
| 7,491,424 B2 | * | 2/2009 | Hersch et al. | ........... B41M 1/18 |
| | | | | 358/3.13 |
| 8,902,483 B2 | * | 12/2014 | Aharon et al. | ....... H04N 1/6033 |
| | | | | 358/504 |

OTHER PUBLICATIONS

Pjanic, P. Hersch, R.D., Specular color imaging on a metallic substrate, In Proc. IS&T 21st Color Imaging Conference, 61-68 (2013).

Sharma, G., Color fundamentals for digital imaging, in Digital Color imaging Handbook (G. Sharma Ed.), Chapter 1, CRC Press, 1-43 (2003).

Bernardini, F.,Mittleman, J.,Rushmeier H,Silva, C., and Taubin, G.,The Ball-Pivoting Algorithm for Surface Re-construction,IEEE Trans.Vis. and Comp. Graph. 5, 4,349-359 (1999).

(Continued)

*Primary Examiner* — Scott A Rogers

(57) ABSTRACT

We propose new methods for creating color or achromatic images that are printed with classical cyan, magenta, yellow and a white diffusing ink on a metallic substrate. We optimize the surface coverages of the cyan, magenta, yellow and white inks in order to create color prints on a metallic surface that look bright and colorful under specular reflection and also look good under non-specular observation conditions. We also provide new means for the prevention of counterfeits. A first effect enables viewing on the same metallic print one achromatic image in specular viewing mode and a second independent achromatic image in non-specular viewing mode. The second effect enables hiding a pattern such as text, graphics or a grayscale image within the printed color image in one viewing mode, specular or non-specular and showing that pattern in the second viewing mode, non-specular or specular, respectively.

23 Claims, 15 Drawing Sheets

(56) References Cited

OTHER PUBLICATIONS

Agar, U., Model Based Color Separation for CMYKcm Printing, Prod. IS&T/SID 9th Color Imaging Conference, pp. 298-302, Scottsdale, Nov. 2001.

Qu,Y., Zitinski P.Elias, Gooran,S.,Color prediction modeling for five channel CMYLclrn printing, 2014, Color Imaging XIX: Displ., Proc,,Hardcopy, and Appl.,SPIE vol. 90158,1-11.
R. Rosser and R.D. Hersch, 2010. "Introducing ink spreading within the cellular Yule-Nielsen modified Neugebauer model", in Proc. IS&T 18th Color Imaging Conference, 295-300.

* cited by examiner

| IS-CYNSN % White | $\Delta E_{94}$ | | | | | |
|---|---|---|---|---|---|---|
| | Specular (25°:25°) | | | Non-specular (0°:45°) | | |
| | Mean | 95% | Max | Mean | 95% | Max |
| 0% | 1.31 | 3.07 | 5.72 | 1.16 | 2.95 | 9.78 |
| 25% | 1.00 | 2.60 | 4.29 | 1.12 | 3.59 | 5.14 |
| 50% | 1.12 | 3.96 | 6.77 | 1.25 | 4.31 | 4.58 |
| 75% | 0.90 | 2.44 | 3.49 | 1.08 | 3.11 | 4.16 |
| 100% | 1.17 | 3.64 | 5.05 | 1.13 | 3.16 | 3.99 |

FIG. 5
| Prints on silver sheet with white ink halftone | $\Delta E_{94}$ | | |
|---|---|---|---|
| | Mean | 95% | Max |
| Specular (25°:25°) | 1.82 | 3.58 | 5.44 |
| Non-specular (0°:45°) | 2.0 | 3.37 | 6.43 |
FIG. 6
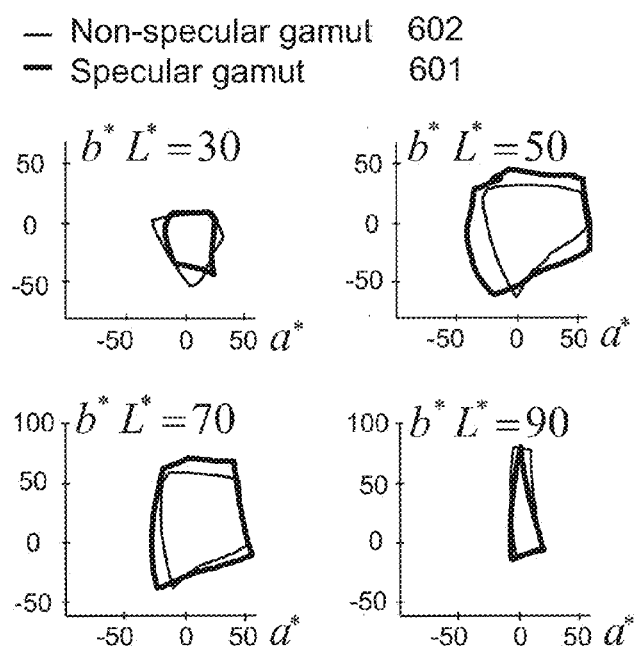
— Non-specular gamut 602
— Specular gamut 601
FIG. 7
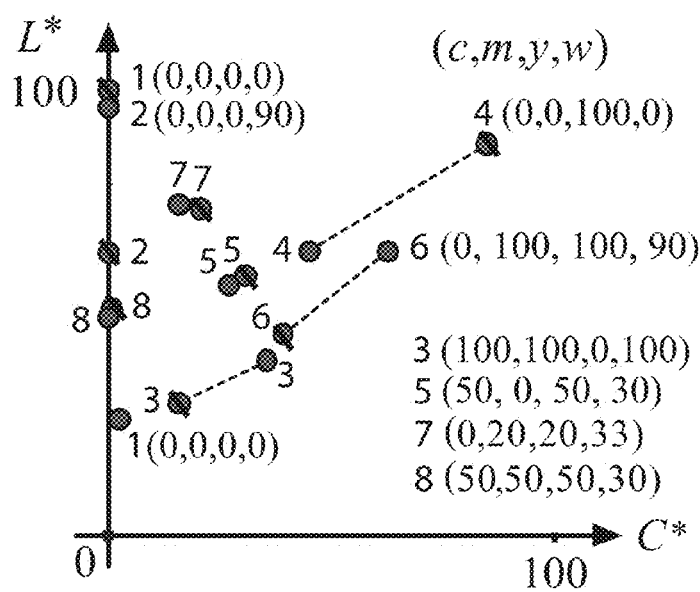
$(c,m,y,w)$
1 (0,0,0,0)
2 (0,0,0,90)
4 (0,0,100,0)
6 (0, 100, 100, 90)
3 (100,100,0,100)
5 (50, 0, 50, 30)
7 (0,20,20,33)
8 (50,50,50,30)

COLOR REPRODUCTION, PATTERN HIDING AND IMAGE ALTERNATIONS WITH HALFTONE PRINTS ON METAL

The content of the present invention is presented as a technical paper at the SIGGRAPH 2015 conference that takes place between $9^{th}$ of August and the $13^{th}$ of August 2015. The corresponding printed paper is available 2 weeks before the start of the conference, from the ACM Digital Library.

BACKGROUND OF THE INVENTION

We present new methods for creating color or grayscale images that are printed with classical inks such as cyan, magenta, yellow and a white diffusing ink on a metallic substrate. A first goal is to optimize the surface coverages of the classical cyan, magenta, yellow inks and of the white ink in order to create color prints on a metallic surface that look bright and colorful under specular reflection and also look good under non-specular observation conditions. The second goal is to provide new means for the prevention of counterfeits. Two main effects are available. A first effect enables viewing on the same metallic print one grayscale image in specular viewing mode and a second independent grayscale image in non-specular viewing mode. The second effect enables hiding a pattern such as text, graphics or a grayscale image within the printed color image in one viewing mode, specular or non-specular and showing that pattern in the second viewing mode, non-specular or specular, respectively.

These varying color images enable preventing counterfeits of security documents and valuable articles and at the same time create surprising effects that can be used to increase their attractiveness and aesthetics. Therefore, the invented color imaging methods may also be useful for decoration, advertisement, art and amusement parks.

In respect to the prior art, U.S. Pat. No. 7,491,424 B2, Reproduction of security documents and color images with metallic inks, filed 19 May, 2003, to inventors R. D. Hersch, F. Collaud, and P. Emmel, teaches a security feature obtained by combining a metallic ink and standard inks printed on paper to create color images with embedded patterns. In contrast to the present work, the prints were obtained with a metallic ink and classical inks printed on white paper and the patterns were only hidden when viewed under non-specular observation angles. In addition, since the metallic ink particles are not completely flat, the specularity of the metallic print is less pronounced than with the present invention, where the print substrate is formed by a very flat metallic layer possibly coated with a transparent non-absorbing ink attracting layer on which the colored and white ink halftones are printed.

Pjanic and Hersch (also inventors in the present invention) created a color reproduction workflow for printing with classical inks on a metallic substrate. In order to establish the correspondence between amounts of inks and resulting color under specular reflection, they used an ink spreading enhanced cellular Yule-Nielsen spectral prediction model. This model is calibrated with patch reflectances measured under specular reflection. The resulting printed colors appear bright and colorful under specular reflection, but look dark and colorless under non-specular reflection, see publication by P. Pjanic and R. D. Hersch, Specular color imaging on a metallic substrate, In Proc. IS&T 21st Color Imaging Conference, 61-68 (2013). The authors did not consider the possibility of using a white diffusing ink to create appealing color images also in non-specular viewing mode.

SUMMARY OF THE INVENTION

In the present contribution, we aim at producing partly specularly reflecting and partly diffusely reflecting prints that look bright and colorful under specular and also look nice under non-specular observation angles. We rely on the ability to print on top of the metallic substrate diffusely reflecting white ink halftones that reduce the specular reflection component and increase the diffuse reflection component of the print. In addition, we offer the possibility of hiding patterns within a grayscale or color image when seen under specular viewing conditions and make them appear when viewed under non-specular viewing conditions or vice versa.

We rely on the fact that increasing the amount of white ink darkens the image under specular viewing conditions but increases the lightness of the image under the non-specular viewing conditions and that the increase of similar amounts of cyan, magenta and yellow inks darkens the image both under specular and non-specular viewing conditions.

Thanks to the trade-off between the amounts of the white and of the colored inks, the lightness can be kept constant in one viewing mode, specular or non-specular, and can be varied in the second viewing node, non-specular or specular, respectively. This also enables us to produce a metallic print that shows a first grayscale or low-chroma image in one viewing mode, and then, by tilting it to the other viewing mode, shows a second independent grayscale or low-chroma image.

Reproducing high-quality color images on a metallic layer providing a high quality appearance both under specular and non-specular observation conditions comprises a preparation phase and a printing phase. During the preparation phase, the specular and non-specular color prediction models, relying on an ink-spreading enhanced cellular Yule-Nielsen modified Spectral Neugebauer model, are calibrated. Optimal sub-gamuts are created in specular and non-specular viewing modes, by considering surface coverages yielding colors that provide the closest color to the input color, both under specular and non-specular viewing conditions. Then a color reproduction table is created by traversing the space of RGB input colors, mapping them to the optimal sub-gamuts and fitting the surface coverages yielding colors closest to the gamut mapped colors. This yield correspondences between input RGB colors and surface coverages of the inks. These correspondences are stored in the color reproduction table. During the printing phase, the table is accesses with the input image colors and the surface coverages of the inks are obtained. These surface coverages enable creating the color separation layers that are then halftoned and printed.

Reproducing on a metallic surface a first image viewable in the primary viewing mode, specular or non-specular, which becomes a second image in the secondary viewing mode, non-specular or specular, respectively, requires building instead of a color reproduction table an enhanced color reproduction table. This enhanced color reproduction table has as entries in addition to the input RGB values used to reproduce the first image, lightness values to reproduce the second image that is viewable in the secondary viewing mode. Patterning sub-gamuts are created by gathering all colors that are inside the optimal sub-gamuts and that provide a sufficient large lightness variation range in the secondary viewing mode. The full range of input RGB colors is sampled and the colors are gamut mapped into the patterning sub-gamut. For the gamut mapped colors and for a large set of lightnesses in secondary viewing mode, ink surface coverages are fitted and placed at the corresponding locations of an augmented 4D color reproduction table. During the printing phase, the augmented color reproduction table is accessed with the RGB values of the first image and the lightness values of the second image. The surface coverages of the inks are read from the table and used to create the color separation layers, perform the halftoning and print the halftoned color separation layers on the metallic surface or on top of an ink attracting transparent layer located on the metallic surface. Direct use of this setup enables printing an image that shows a first grayscale or variable intensity picture in a primary viewing mode and a second grayscale or or variable intensity picture in the secondary viewing mode. One may also create for the second image a visual element such as a pattern message specified by a mask that describes lightness variations of the second image in respect to the first image. These lightness variations enable computing the actual lightnesses in secondary viewing mode. The corresponding message then appears when viewing the color halftone print in the secondary viewing mode. One may also enhance areas by highlighting them in the second image, for example by specifying for the corresponding areas in the mask positive lightness variations and possibly negative lightness variations for surrounding image areas. Then the color print will show the normal image in primary viewing mode and the image with the highlighted areas in the secondary viewing mode. The presented inventive elements are described by methods which may be implemented as computer programs comprising software functions that perform the corresponding method steps.

The surprising image alternating effects, e.g. an image printed on metal that shows a first picture and upon tilting of the print shows a second independent picture, are unique when considering prints with classical and white ink halftones on a metallic layer. Therefore, with a microscope such as a USB microscope, one may verify that the print incorporates white as well as classical ink halftones. If this print also shows the alternating pictures when tilting it so as to view it under specular and then under non-specular viewing conditions or vice-versa, then the document that contains this print can be considered as authentic.

The primary application area for metallic prints with alternating images or hidden patterns is the protection of security documents and valuable articles. Without the software optimizing the surface coverages of the contributing classical transparent inks (e.g. cyan, magenta, yellow) and the white diffusing ink, it is neither possible to create alternating images nor possible to hide patterns. Therefore, the observation of a metallic print showing alternating images or showing a color image with a pattern revealed under only one of the two viewing modes, specular or non-specular, tells the observer that the observed document or article is authentic.

Due to their high decorative values, metallic color prints with alternating images or with hidden patterns that are revealed under only one of the two viewing modes may also be used for the decoration of walls and goods that have a high symbolic value, such as cars, watches, jewelry, smartphones, tablets, portable computers, fashion articles, toys, expensive drinks and cosmetic articles.

Finally, metallic color prints synthesized with optimal surface coverages of the contributing classical and white inks look bright and colorful under specular and also look nice under non-specular observation conditions. They are therefore of a higher quality compared with prints that are generated by printing with cyan, magenta, and yellow alone on metal or with non-optimized surface coverages of cyan, magenta, yellow and white on metal. Such high-quality metallic color prints may become fashionable for exhibitions or for high quality reproductions decorating the walls of homes, institutions and companies.

BRIEF DESCRIPTION OF THE DRAWINGS

FIG. 5 shows the prediction accuracy for the 4 cyan, magenta, yellow and white ink spectral prediction model (256 test samples different from the calibration samples), expressed as average, 95% quantile and maximal $\Delta E_{94}$ color difference;

FIG. 6 shows the maximal print gamuts in CIELAB space, under specular (thick line 601) and non-specular (thin line 602) viewing conditions;

FIG. 7 shows in the lightness-chroma plane CIELAB colors of samples of surface coverages (c,m,y,w) measured in specular (disk with oblique bar) and non-specular (disk without oblique bar) viewing conditions;

Figure 13:
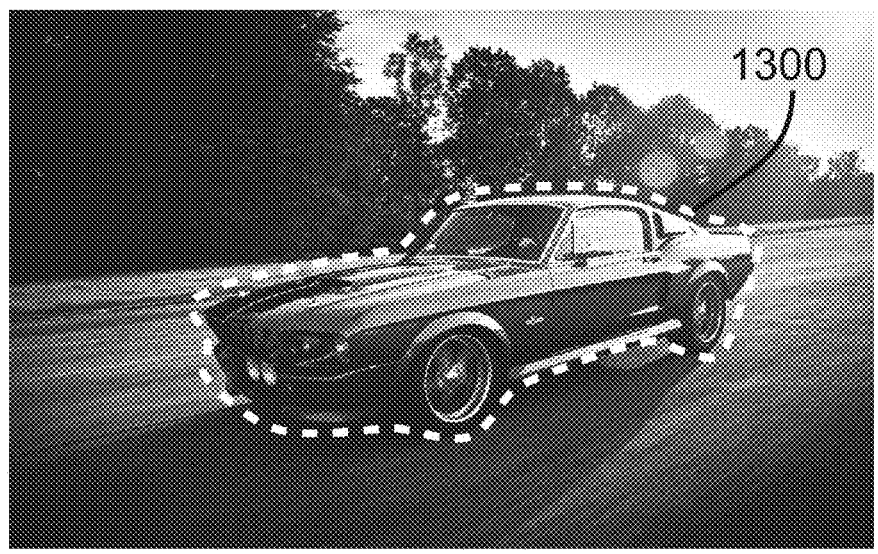
Figure 14A:
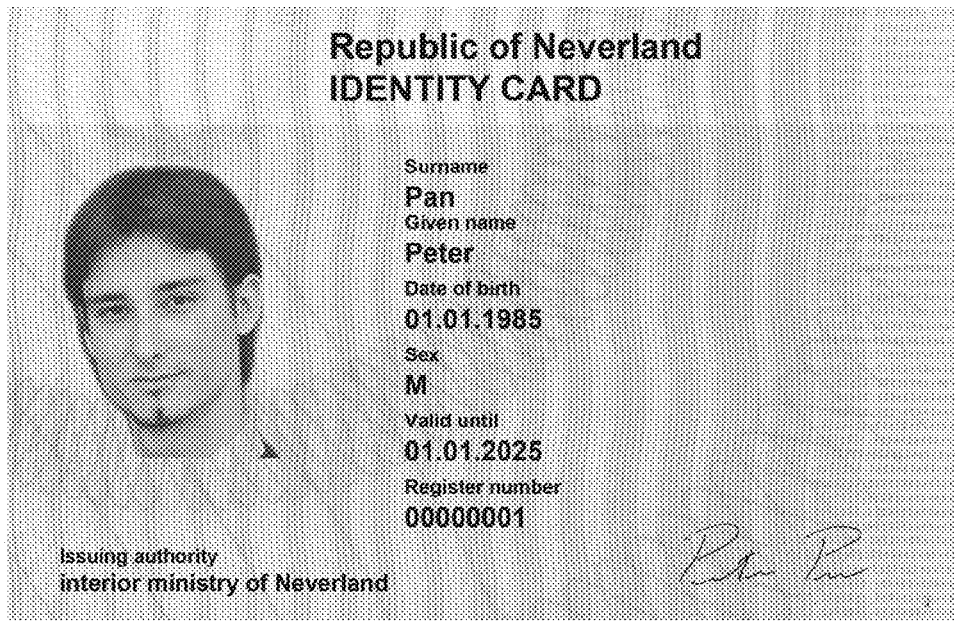
Figure 14B:
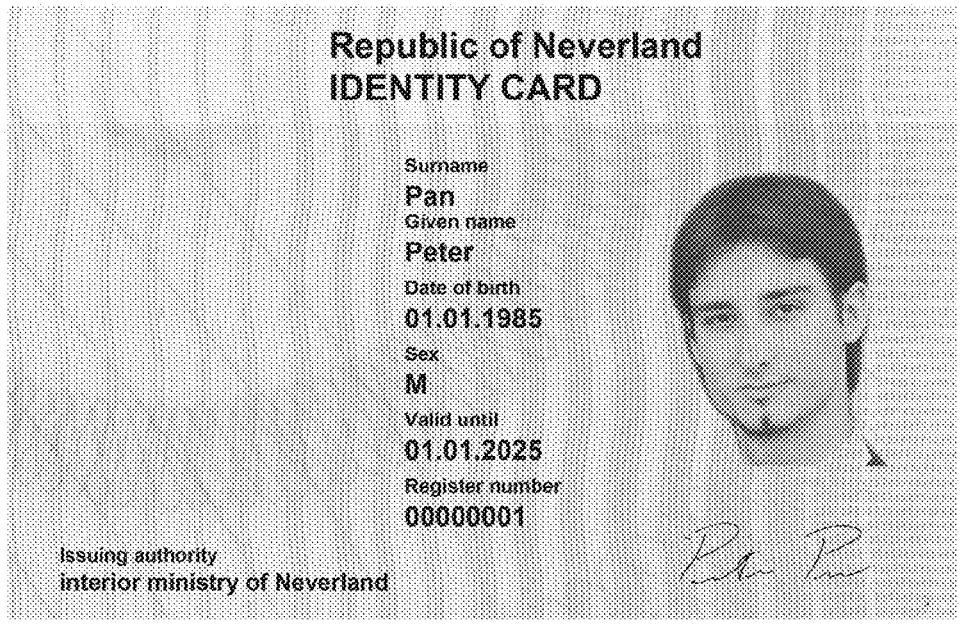
Figure 15A:
Figure 15B:
Figure 16:
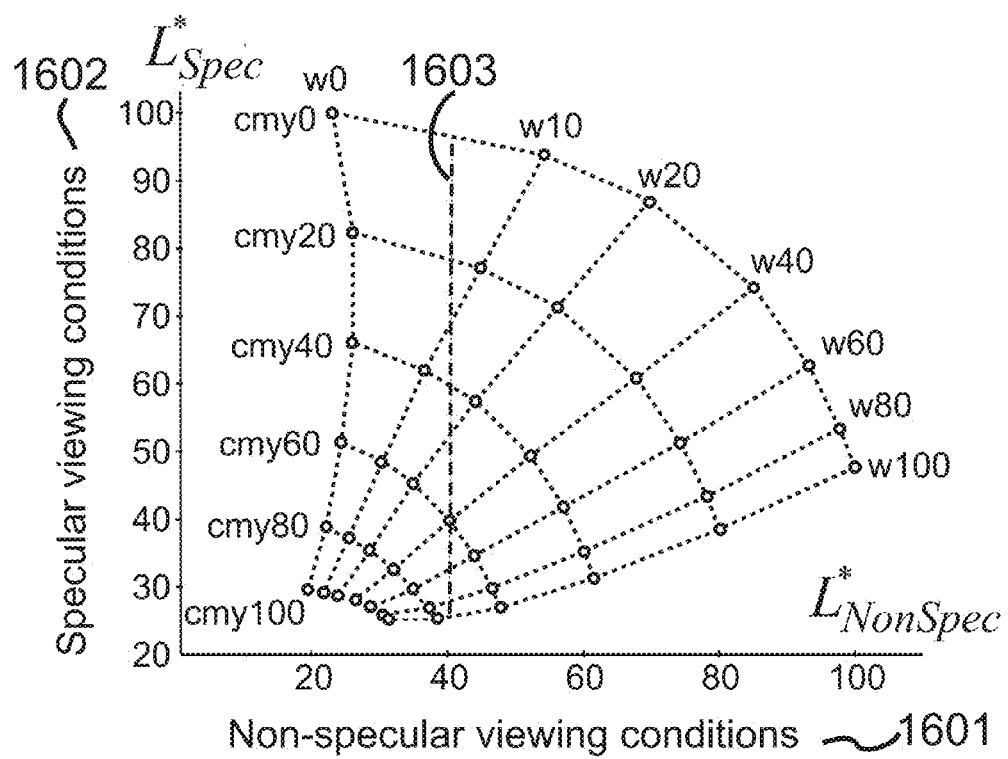
Figure 17:
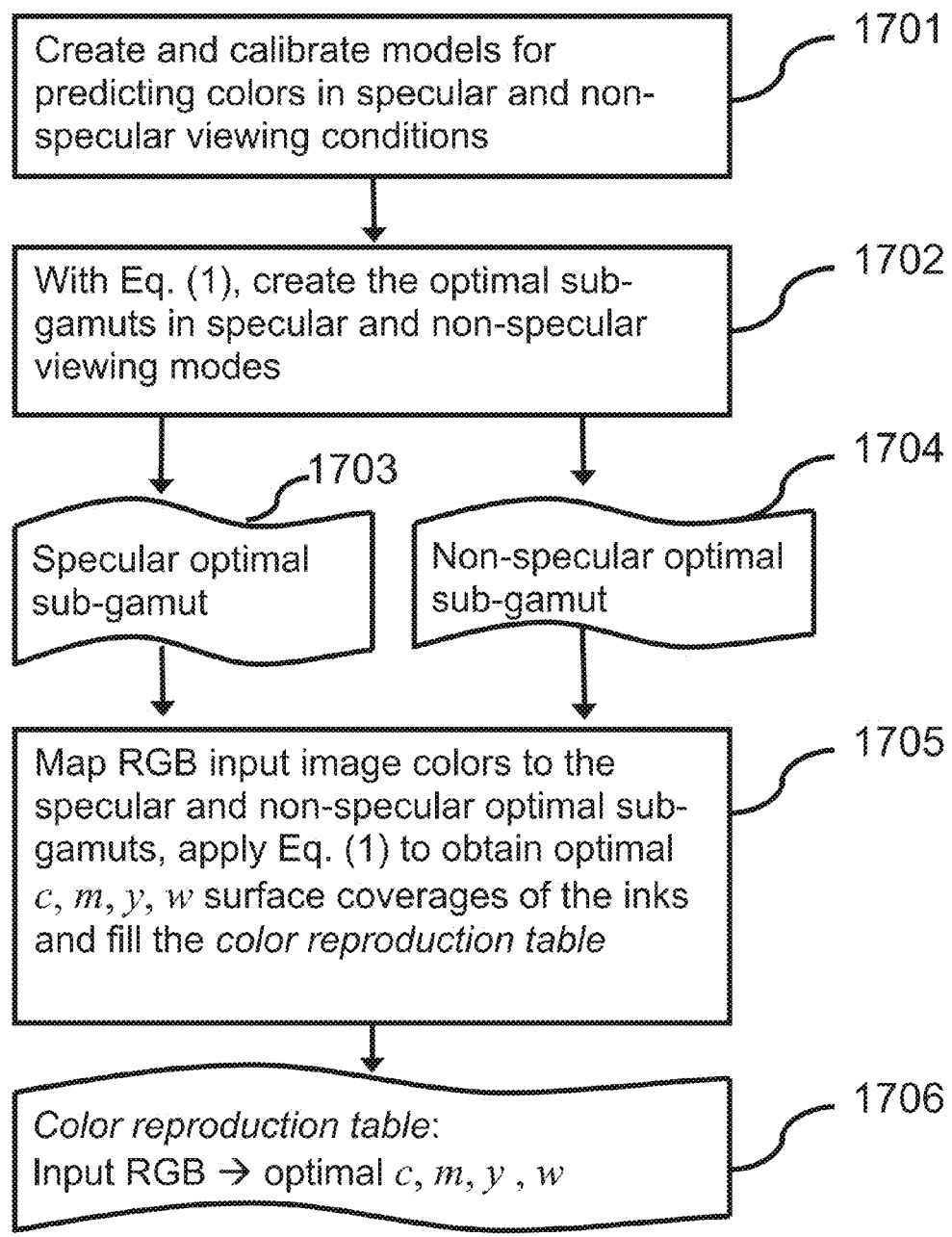
Figure 18:
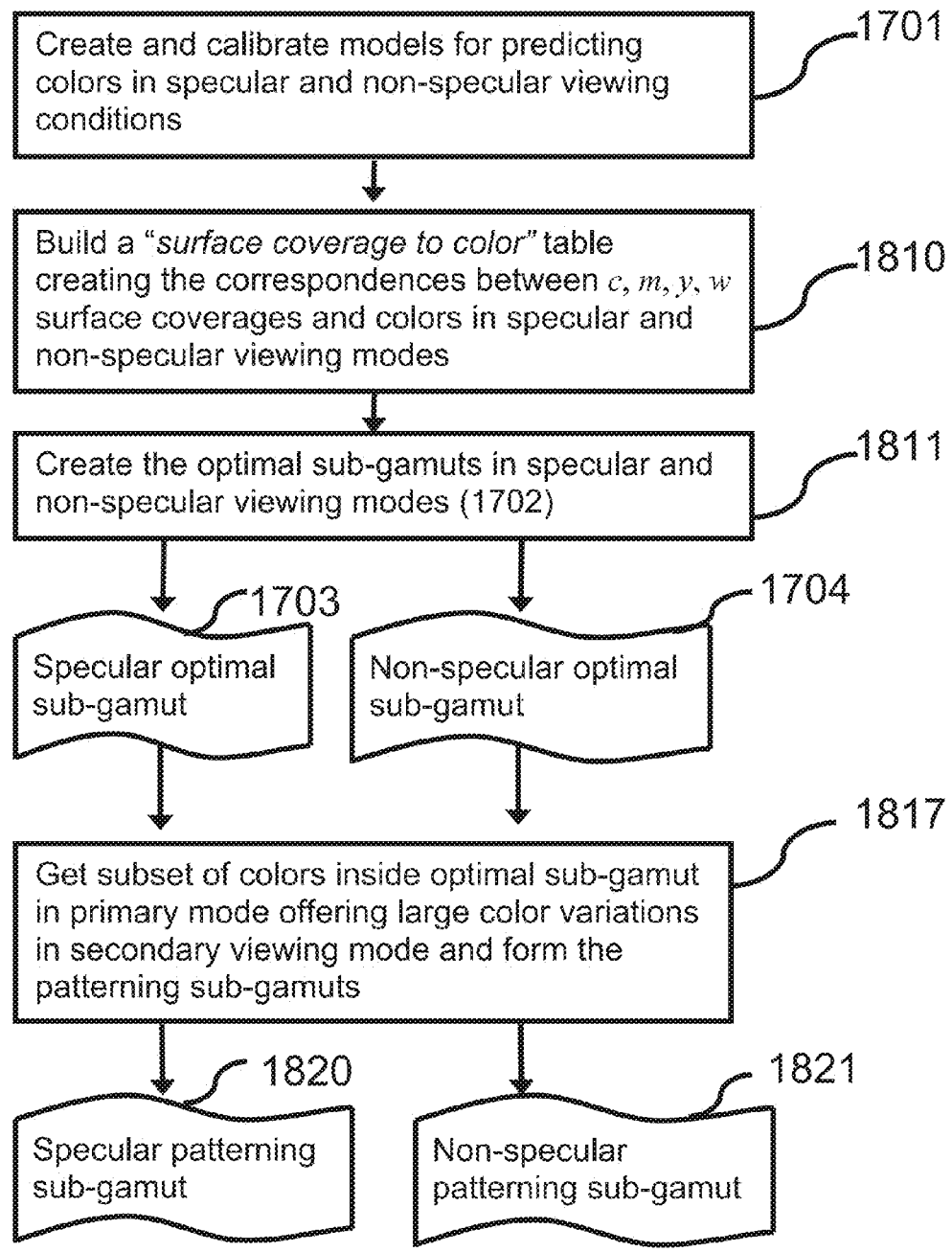
Figure 19B:
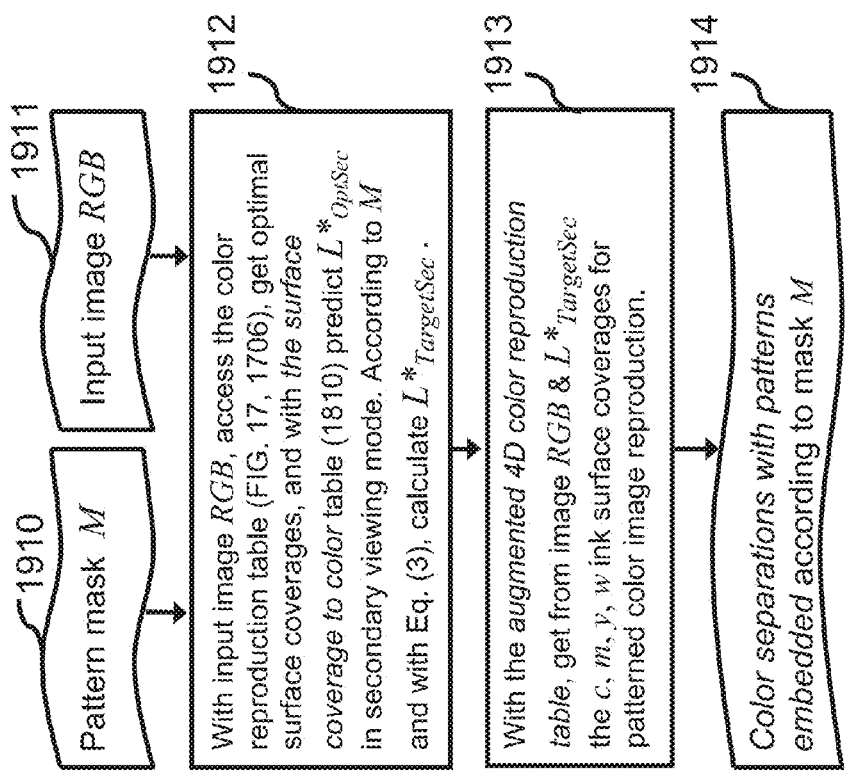
Figure 19A:
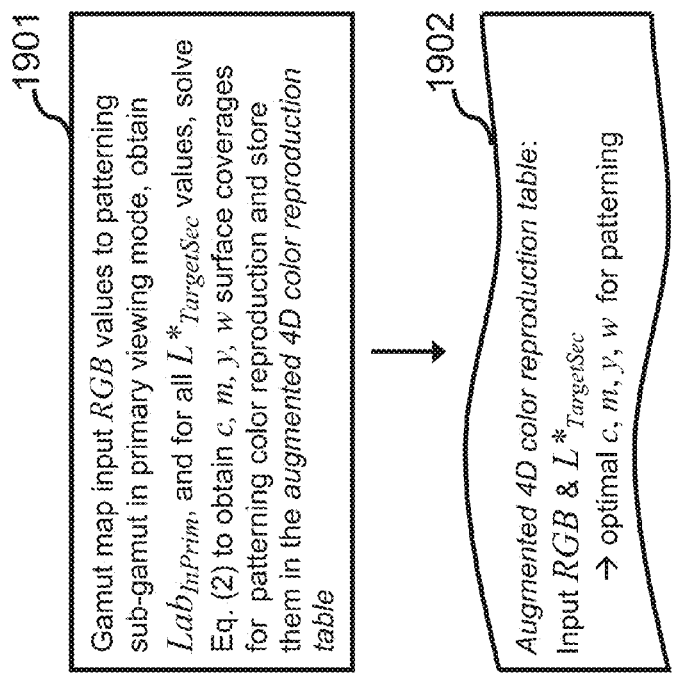
Figure 20:
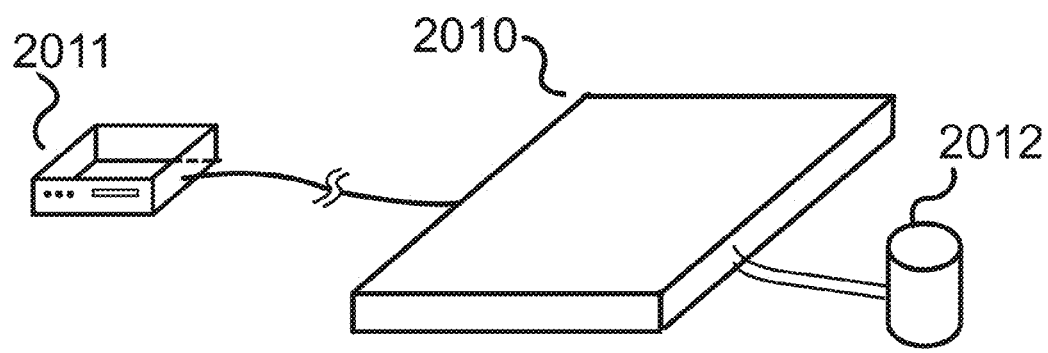
Figure 21:
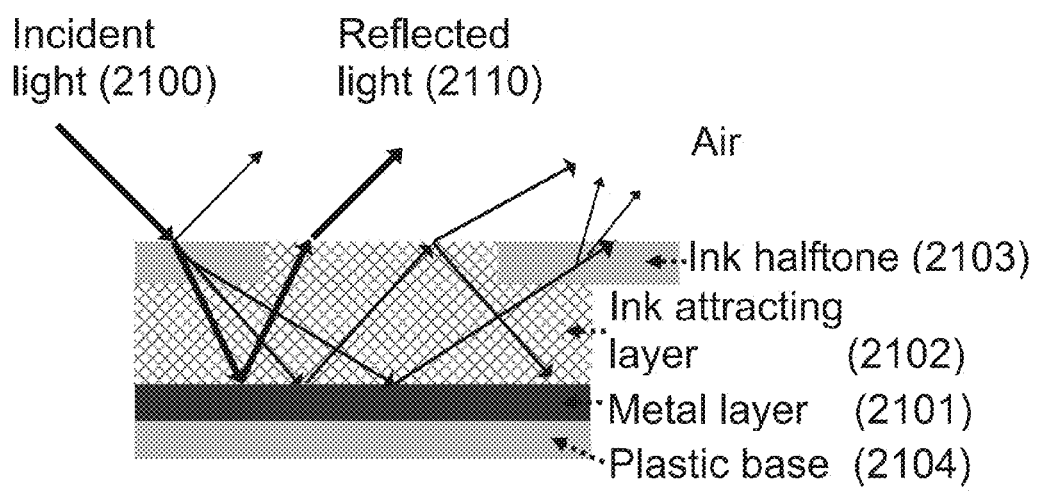
Figures 22A, 22B:
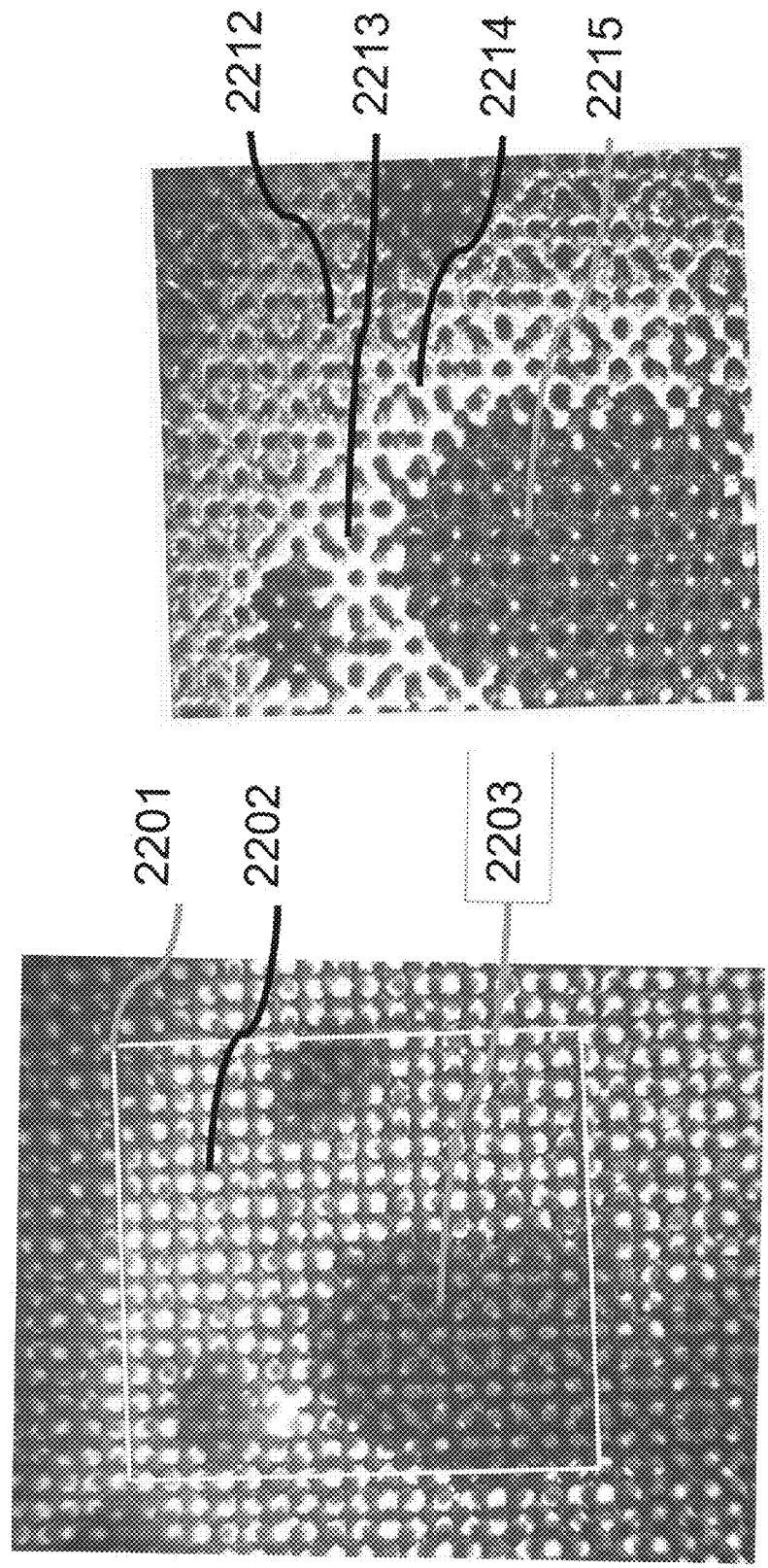

FIG. 13 shows schematically a car that appears normally in non-specular viewing mode that is highlighted in specular viewing mode by keeping the lightness of the pattern foreground (the car) and reducing the lightness of the background;

FIGS. 14A and 14B show the black-white reproduction of a preview of the print of an identity card, with the face appearing alternately left and right, when tilting the card, with FIG. 14A showing the non-specular view and FIG. 14B showing the specular view;

FIG. 15A shows a preview of the print where the first grayscale image (village) appears in primary specular viewing mode and FIG. 15B shows a preview of the second grayscale image (girl) that appears in secondary non-specular viewing mode;

FIG. 16 shows the relationship between individual lightness values in the primary viewing mode (specular or non-specular) and the corresponding range of lightness values achievable in the secondary viewing mode, with related surface coverages of the inks, where achromatic colors are defined by equal surface coverages of the c, m, y inks (e.g. cmy40 means 40% surface coverages of c, m, y inks) and by the surface coverage of the white ink (e.g. w20 means 20% surface coverage of white ink);

FIG. 17 shows the flowgraph of the "preparation phase" for high-quality color reproduction on metal both under specular and non-specular reflections by calculating the optimal surface coverages of the cyan, magenta, yellow and white ink dots;

FIG. 18 shows the flowgraph of part of the "preparation phase" for embedding patterns in color prints on metal which are hidden in one viewing mode, specular or non-specular, and revealed in the other viewing mode;

FIG. 19A shows the flowgraph of the remaining part of the "preparation phase" for performing the color separation with patterns embedded into color images on metal;

FIG. 19B shows the flowgraph of the "printing phase" for the color separation and printing of color images on metal with patterns hidden in one viewing mode and revealed in the other viewing mode;

FIG. 20 shows a computing system comprising comprises a CPU, memory, disks and a network interface operable to run software that comprises predefined callable functions;

FIG. 21 shows a cross-section through a metallic halftone print formed by a metallic foil 2101 located on a base 2004, an ink attracting transparent layer 2102 and a halftone ink layer 2103 comprising colored and white inks;

FIG. 22A shows a photograph of a metallic halftone print taken under non-specular reflection under a microscope, where a first dot halftone dot structure appears which highlights the white ink dot portions that have not been overprinted by colored ink dots;

FIG. 22B shows a photograph of the same area of the metallic halftone, taken under specular reflection, where a second, different halftone dot structure appears, that shows bright unprinted metallic halftone areas and dark white and colored dots areas.

DETAILED DESCRIPTION OF THE INVENTION

We present a new approach for the reproduction of color images on a metallic substrate that look bright and colorful under specular reflection observation conditions and also look good under non-specular reflection observation conditions. We fit amounts of both the white ink and the classical cyan, magenta and yellow inks according to a formula optimizing the reproduction of colors simultaneously under specular and non-specular observation conditions. We can also enhance image areas (foreground) in one of the two viewing modes by increasing their lightnesses and possibly by also decreasing the lightnesses of the remaining parts (background). In addition, we can hide patterns such as text or graphical symbols in one viewing mode, specular or non-specular, and reveal them in the other viewing mode. We rely on the trade-off between amounts of white diffuse ink and amounts of cyan, magenta and yellow inks to control lightness in specular and in non-specular observation conditions. Further effects are variable intensity (grayscale) images that alternate from a first image to a second independent image when tilting the print from specular to non-specular reflection observation conditions. Applications comprise the prevention of counterfeits, document security, publicity, posters, as well as surprising effects for amusement parks.

Vocabulary

Classical inks are substantially transparent chromatic or achromatic inks that are in general use for printing on paper, i.e. primarily the cyan, magenta and yellow inks as well as further colored inks, such as light cyan, light magenta, red, green, blue, orange, pink, violet, or achromatic inks such as gray and black inks Transparent inks are inks that absorb part of the light in some wavelength range and transmit the remaining light to the next layer. The white ink is a strongly diffusing white that reflects a large part of the incident light in all directions. The metallic layer is a flat layer that reflects the incident light primarily in the specular direction.

"Specular viewing conditions", "specular observation conditions" or equivalently "specular viewing mode" indicate that the print is viewed by having mainly light specularly reflected by the metallic print reaching the eyes of the observer. "Non-specular viewing conditions", "non-specular observation conditions" or equivalently "non-specular viewing mode" indicate that the print is viewed by having mainly light diffusely reflected by the metallic print reaching the observer.

A primary color is a color that appears in primary viewing mode, specular or non-specular, and a secondary color is a color that appears in secondary viewing mode, non-specular or specular, respectively.

A printable color is a color that is part of the print gamut. A printable color located within the optimal sub-gamuts is a color produced by cyan, magenta, yellow and white ink surface coverages that appears to be the same under both specular and non-specular observation conditions.

The expression "printing on top of the metallic substrate" does not necessarily mean that the inks are directly printed on the metallic substrate. The metallic substrate may be covered with a transparent ink attracting layer on which the inks are printed.

A variable intensity image is either a grayscale image or a low-chroma image whose chroma remains low-chroma and whose lightness varies.

Illumination for Creating Specular and Non-Specular Viewing Conditions

Under specular viewing conditions, light coming from a given illuminating solid angle, such as a window, hits the metallic print and is specularly reflected into the viewer's eye. There is a range of viewing angles under which the print appears in specularly reflecting mode, i.e. one may tilt the print slightly in different directions and still remain in specular viewing mode. The human visual system adapts to the specular reflection. The diffusely reflecting image parts have only a very small contribution to the reflected light. Under non-specular viewing conditions, the print is tilted so as to avoid the light crossing the window from being specularly reflected into the viewer's eyes. Only light from the window that is diffusely reflected by the print reaches the viewer's eye. The human visual system adapts to the non-specular viewing conditions. The unprinted specularly reflecting metallic parts look dark.

Our goal is to correctly reproduce color images under both specular and non-specular viewing conditions, to hide an image in one viewing mode and reveal it in the other viewing mode and to alternate between two grayscale images when tilting the print from the first to the second viewing mode. In order to achieve these goals, it is sufficient to limit our considerations to the specular and the non-specular viewing conditions, as defined above.

Figure 1A:
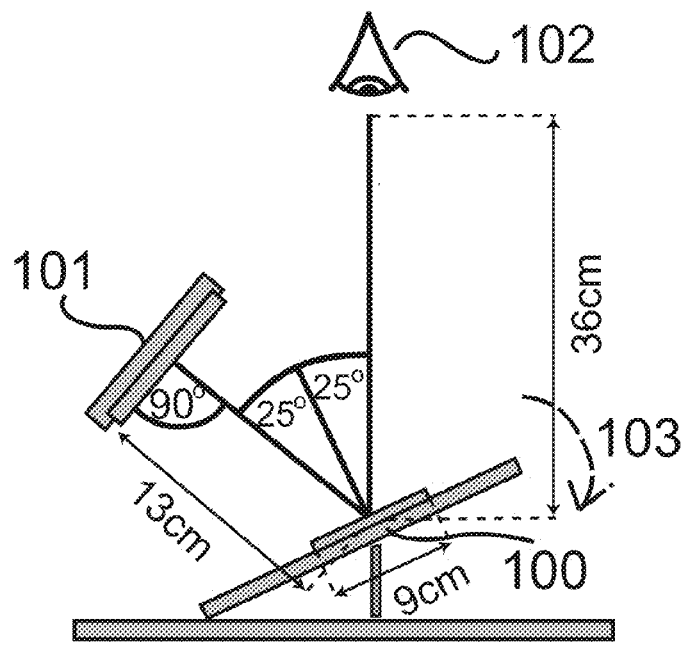
FIG. 1A shows an example of a setup to observe a print under specular viewing conditions, with a light table 101, the print 100 and the observer 102.
Figure 1B:
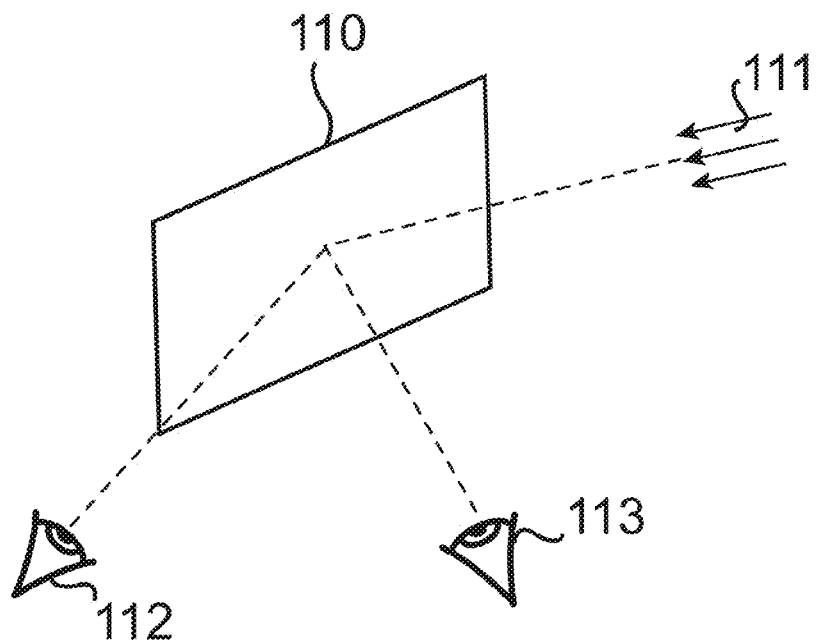
FIG. 1B shows an example of a setup to observe a metallic print 110 illuminated by a light source 111 either under specular 112 or under non-specular 113 viewing conditions.

Regarding the optimal illumination conditions, instead of looking at the print in front of a window, one may create a setup where a flat uniformly illuminating light table (FIG. 1A, 101) is placed in a dark room. The light table may be placed at an oblique orientation and the print 100 placed so as to view it under specular viewing conditions (FIG. 1A). By tilting 103 the print 100 towards the eye 102, it may also be viewed under non-specular viewing conditions. By tilting the print back and forth, one may view it alternately under specular and non-specular illumination conditions. One may also create a large setup (FIG. 1B), where the print 110 is illuminated 111 from one side. Then, when walking along that print at a certain distance from it, the observer may see the print first under specular 112 and then under non-specular 113 viewing conditions. Such a setup may be used for showing posters, for publicity or for entertainment.

Color Reproduction Workflow for Metallic Color Prints

A color reproduction workflow comprises a preparation phase (FIG. 2, 200). and a printing phase 210. The preparation phase comprises the characterization of the printing device (e.g. with a spectral prediction model 201), the creation of the gamut of all printable colors 202, the definition of a gamut mapping strategy that maps input colors to printable colors and the creation of a relationship between input or desired color and ink surface coverages 203 (see publication by Morovic and Lammens, Color Management, in Colorimetry: Understanding the CIE system, (Ed. J. Schanda), Chapter 7, J. Wiley, 159-206, 2007). A color reproduction table 204 is created by sampling the input RGB 3D color space, transforming RGB colors to CIELAB, performing gamut mapping, and for the gamut mapped colors, obtaining the corresponding ink surface coverages. Each RGB entry of the table 204 contains the ink surface coverages needed to reproduce that color.

In the present work, we use a spectral prediction model 201 to characterize the printer, i.e. to establish the relationship between surface coverages of the ink dots and the resulting color. We always consider RGB input colors referenced in respect to a device independent color space, in the same manner as for example sRGB (http://www.w3.org/Graphics/Color/srgb). The conversion from a given RGB color space to the device-independent CIE-XYZ tri-stimulus space is assumed to be well defined.

The workflow (FIG. 2) comprises also a printing phase 210 where the color reproduction table 204 is used for processing and printing the input images, i.e. for mapping input colors 211 to corresponding ink surface coverages 212. This yields the color separations 213 that are halftoned and printed (214).

As a concrete embodiment, we created metallic prints formed by a silver substrate printable by a white diffusing ink halftone and, on top of it, classical cyan, magenta, and yellow color halftones. The samples were printed on a commercially available isotropic silver film substrate (4.7 mil thickness, 165 g/m2) with an Epson Stylus Pro WT7900 inkjet printer at a resolution of 1440 dpi and at a screen frequency of 100 lpi. The light diffusing white ink clustered-dot halftone layer is printed at an angle of 15° and the cyan, magenta and yellow transparent ink halftone layers are printed dot-on-dot at the angle of 60°. For inkjet prints on metallic substrates, dot-on-dot printing of the colored inks minimizes local color variations.

We consider two predominant observation conditions, namely specular and non-specular observation conditions. We assume that under specular observation, the "whitest" point on which the eye adapts is the unprinted metallic surface and that under non-specular observation, the "whitest" point is the light diffusing fulltone white ink. Under specular viewing conditions, color halftones on silver without white ink appear very bright and colorful. After the transition between specular and non-specular reflectance, they become dark and colorless. In contrast, color halftones printed on top of the fulltone white ink remain bright across a large range of observation angles. Intermediate white ink halftones on silver (e.g. 30% surface coverage) are very bright at specular observation angles and are also bright at non-specular observation angles. This indicates that white ink halftones have the potential to create images that have a good dynamic range under both specular and non-specular observation conditions.

In order to characterize a print under both the specular and the non-specular viewing conditions, we introduce two separate color spaces. The specular CIELAB color space used for characterizing samples viewed under specular reflection conditions is relative to the unprinted metallic substrate as its "whitest color". In contrast, the non-specular CIELAB color space for characterizing samples viewed under non-specular reflection is, in respect to its whitest color, relative to the fulltone white diffusing ink printed on top of the metallic substrate.

CIELAB colors of specularly reflecting metallic print samples are obtained by measuring reflectance factors with a custom setup formed by a light source illuminating the print sample at 25° and by a fiber capturing the reflected light at 25°. The reflectance factor is obtained by dividing the captured irradiance of a color patch by the irradiance of the unprinted metallic substrate, measured under the same (25°:25°) geometry. The reflectance factor is then converted to CIE-XYZ tri-stimulus values under the D65 illuminant and for the CIE 1931 Standard Observer, with the unprinted metallic substrate set as Y=100. CIE-XYZ values are then converted to CIELAB by considering the specularly reflecting unprinted metallic substrate as the reference "white object color stimulus". The non-specular reflectance factors are measured at a 0° incident angle and at a 45° capturing angle with a commercial spectrophotometer. XYZ and CIELAB values are derived in the same way as for the specular colors, but with the fulltone white ink as the white reference.

Spectral Model for Predicting the Color of Metallic Prints

A spectral prediction model creates the relationship between amounts of inks deposited on a given substrate and the resulting printed color viewed under specific illumination and observation conditions. The spectral prediction model is calibrated by measuring the reflection spectra of all Neugebauer primaries (substrate, fulltone inks and their superpositions) as well as of a number of halftones. We use as prediction model the cyan (c), magenta (m), and yellow (y) based cellular Yule-Nielsen modified spectral Neugebauer model (CYNSN) for dot-on-dot halftones, with one level of subdivision, see the article by R. Balasubramanian, Optimization of the spectral Neugebauer model for printer characterization, Journal of Electronic Imaging 8, 2, 156-166 (1999), incorporated by reference and hereinafter referenced as [Balasubramanian 1999]. The 3D c, m, y ink surface coverage space is divided into $2^3=8$ sub-cubes with vertices at 0, 50% and 100% nominal surface coverages of each of the inks There are therefore $3^3=27$ primary reflectances. The Yule-Nielsen modified spectral Neugebauer model (YNSN) is separately applied on each sub-cube.

To account for ink spreading, the central point within each sub-cube is printed and measured. The three c, m, y ink surface coverages are fitted to minimize the square difference between the measured spectral reflectance and the reflectance predicted by the CYNSN model. This yields within each sub-cube and for each ink, a specific tone reproduction curve. In total, the ink-spreading enhanced cellular model (IS-CYNSN) requires 27 primary reflectance measurements and 8 additional reflectance measurements for establishing the ink spreading curves, i.e. a total of 35 spectral reflectance measurements, see publication by R. Rossier and R. D. Hersch, 2010. "Introducing ink spreading within the cellular Yule-Nielsen modified Neugebauer model", in Proc. IS&T 18th Color Imaging Conference, 295-300, herein incorporated by reference.

Figures 3, 4:
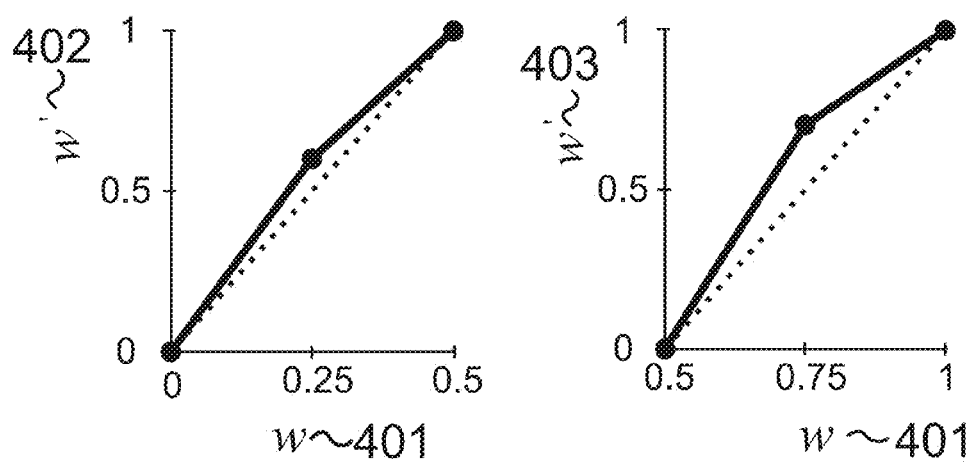
FIG. 3 shows the prediction accuracy of the 3 ink cyan, magenta, yellow IS-CYNSN model in terms of average $\Delta E_{94}$, 95% quantile and maximum $\Delta E_{94}$ color difference, for predefined surface coverages of the white ink on the metallic substrate.
FIG. 4 shows tone reproduction functions w'=f(w) mapping nominal white ink surface coverages to normalized effective white ink surface coverages under specular viewing conditions, separately for the intervals $0 \leq w \leq 0.5$ and $0.5 \leq w \leq 1$.

The prediction accuracy is tested separately at each selected white ink surface coverage and at each of the two viewing conditions for a test set comprising 125 measured printed cyan, magenta and yellow halftones at all combinations of 0%, 25%, 50%, 75% and 100% ink surface coverages. As shown in FIG. 3, for the tested white ink surface coverages, the mean prediction accuracy in terms of $\Delta E_{94}$ difference between predictions and measurements is remarkably high, both for specular and non-specular measuring geometries.

We would like to also predict the reflectances on varying surface coverages of the white ink halftones. For that purpose, we establish one 3-ink model per considered surface coverage of the white ink (0%, 50%, 100%) and per viewing condition. Each prediction model is calibrated separately. Reflectances of c, m, y ink halftones on top of any surface coverage of the white ink are obtained by an interpolation that accounts for the ink spreading behavior of the white ink.

The one-dimensional nominal white ink space is subdivided into two sub-domains, from 0% to 50% and from 50% to 100%. A tone reproduction function, mapping nominal (w) to normalized effective (w') white ink surface coverages, is established for each sub-domain and for each viewing condition. These tone reproduction functions are established with the measurements of the white ink halftone at the center of their respective sub-domains and by applying the Murray-Davis formula for recovering their effective surface coverages, see [Balasubramanian 1999]. FIG. 4 shows for the specular viewing conditions the tone reproduction functions that enable mapping nominal surface coverages w (401) to normalized effective surface coverages w', 402 and 403, for the low and high range sub-domains, respectively.

For each of the two viewing conditions, the predicted spectral reflectance $R_p(c,m,y,w)$ of a halftone with ink surface coverages c,m,y,w is obtained by linearly interpolating between the two reflectances predicted with the two neighboring calibrated 3 ink IS-CYNSN models, using as weights w' and (1−w').

In order to test the prediction accuracy of the overall model, we have printed halftones at all nominal ink combinations of 12.5%, 37.5%, 62.5% and 87.5%. This yields $4^4=256$ test halftone samples for the set of 4 inks (c,m,y,w). These test samples are completely distinct from the calibration samples. They are measured under both specular and non-specular viewing conditions. FIG. 5 shows the prediction accuracy for the proposed c,m,y,w prediction model expressed as average, 95 centiles and maximal $\Delta E_{94}$ color differences.

The colors of prints with a diffuse white and classical inks printed on a metallic layer can be predicted with a good prediction accuracy in both viewing conditions. The prediction model is simple to understand and can be mastered easily.

Maximal Print Gamuts

Thanks to the spectral prediction models, we can predict for each halftone both its specular and its non-specular reflectance. After conversion of reflectances to colors, we obtain a specific gamut in each of the two viewing conditions. These gamuts represent all possible printable colors on the metallic surface and are further referred to as the maximal print gamuts. These non-convex 3D gamut volumes are obtained by sampling the cyan, magenta, yellow ink surface coverage space at small intervals (2.5%), predicting the resulting colors, performing on them in the CIELAB space a Delaunay tetrahedrization and computing the concave hull with the alpha-shapes technique, see the article by Bernardini, F., Mittleman, J., Rushmeier H, Silva, C., and Taubin, G. The Ball-Pivoting Algorithm for Surface Re-construction, IEEE Trans. Vis. and Comp. Graph. 5, 4, 349-359 (1999), hereinafter referenced as [Bernardini et al. 1999] The maximal print gamuts in specular viewing mode 601 and in non-specular mode 602 are presented in FIG. 6. They are called specular print gamut and non-specular print gamut, respectively.

We observe that the two gamuts are similar in terms of lightness ranges. This is due to the fact that in the specular case the white reference is the unprinted metal and in the non-specular case the white reference is the white diffuse fulltone ink. The specular gamut is more chromatic in the mid-tones and less chromatic in the dark and high tones, compared with the non-specular gamut. In FIG. 7, we observe that a single (c,m,y,w) surface coverage can yield very different CIELAB values under specular and under non-specular viewing conditions. For example, sample "2" with a white ink of 90% surface coverage has under non-specular viewing conditions (disk) nearly the maximal lightness L*=98 whereas under specular viewing conditions (disk with oblique bar), it has an intermediate gray lightness of L*=57.

For most ink surface coverages, the hue remains similar under specular and non-specular viewing conditions. Samples printed with a high percentage of white ink that are bright and colorful under non-specular viewing conditions become darker and less colorful under specular viewing conditions. In contrast, samples printed with a low percentage of white ink that are bright and colorful under specular viewing conditions, become dark and dull under non-specular viewing conditions. Colors with a white ink surface coverage of approximately 30% have similar specular and non-specular CIELAB values (in FIG. 7, samples "5", "7" and "8").

Optimizing the Ink Surface Coverages to Obtain the Best Appearance Under Both Specular and Non-Specular Viewing Conditions We would like to print color images on a metallic substrate that have an optimal appearance under both the specular and the non-specular viewing conditions. The maximal print gamuts introduced in the previous section contain all colors realizable when viewing the print under one viewing condition. We need to reduce the volume of the maximal gamuts in order to obtain the subset of colors that are viewable under both specular and non-specular conditions. The resulting optimal sub-gamuts contain only colors that are similar in specular and non-specular mode, e.g. in FIG. 7, colors "5", "7" and "8" but not colors "1", "2", "3", "4", "6". By mapping input gamut colors (e.g. sRGB) to the optimal sub-gamuts, we then ensure that every color is reproducible under both specular and non-specular viewing conditions.

To obtain the optimal sub-gamuts, we propose a cost function whose minimization determines the optimal (c,m,y,w) ink surface coverages for reproducing any input color. We find the unique set of (c,m,y,w) surface coverages that minimizes the color difference between the printed color and the input color, simultaneously under both viewing conditions. The equation for obtaining these (c,m,y,w) surface coverages is $$\{c,m,y,w\} = \mathrm{argmin}[\Delta E_{94}(\mathrm{Lab}_{Spec}(c,m,y,w), \mathrm{Lab}_{InS}) + \Delta E_{94}(\mathrm{Lab}_{NonSpec}(c,m,y,w), \mathrm{Lab}_{InNS})] \quad (1)$$

Subject to $0 \leq \{c,m,y,w\} \leq 1$,
where $\mathrm{Lab}_{Spec}(c,m,y,w)$ and $\mathrm{Lab}_{NonSpec}(c,m,y,w)$ are the predicted CIELAB colors for (c,m,y,w) surface coverages under specular and non specular viewing conditions, respectively, and where $\mathrm{Lab}_{InS}$ and $\mathrm{Lab}_{InNS}$ are input CIELAB colors that are to be reproduced under the specular and non-specular viewing conditions, respectively. The functions $\mathrm{Lab}_{Spec}(c,m,y,w)$ and $\mathrm{Lab}_{NonSpec}(c,m,y,w)$ are obtained by concatenating the reflectance prediction model with the conversion of reflectance to CIE-XYZ tri-stimulus values and the conversion of CIE-XYZ to CIELAB, see Sharma, G. Color fundamentals for digital imaging, in Digital Color Imaging Handbook (G. Sharma Ed.), Chapter 1, CRC Press, 1-43 (2003), incorporated by reference and hereinafter referenced as [Sharma 2003]. The color difference is expressed as $\Delta E_{94}$ color difference [Sharma 2003].

By considering all possible input colors along the L*a*b* axes in steps of 10, and inserting them into Equation (1) as desired specular and non-specular input colors $\mathrm{Lab}_{Ins}$ and $\mathrm{Lab}_{InNS}$, respectively, we obtain corresponding optimal surface coverages c, m, y, w of the cyan, magenta, yellow and white inks, respectively. Each set of optimal surface coverages yield pairs of colors $\mathrm{Lab}_{Spec}(c,m,y,w)$ and $\mathrm{Lab}_{NonSpec}(c,m,y,w)$ visible in the specular and non-specular viewing modes, respectively. The optimal sub-gamuts are obtained by computing the non-convex hull of these colors separately in the specular and the non-specular CIELAB spaces [Bernardini et al. 1999].

Figure 8:
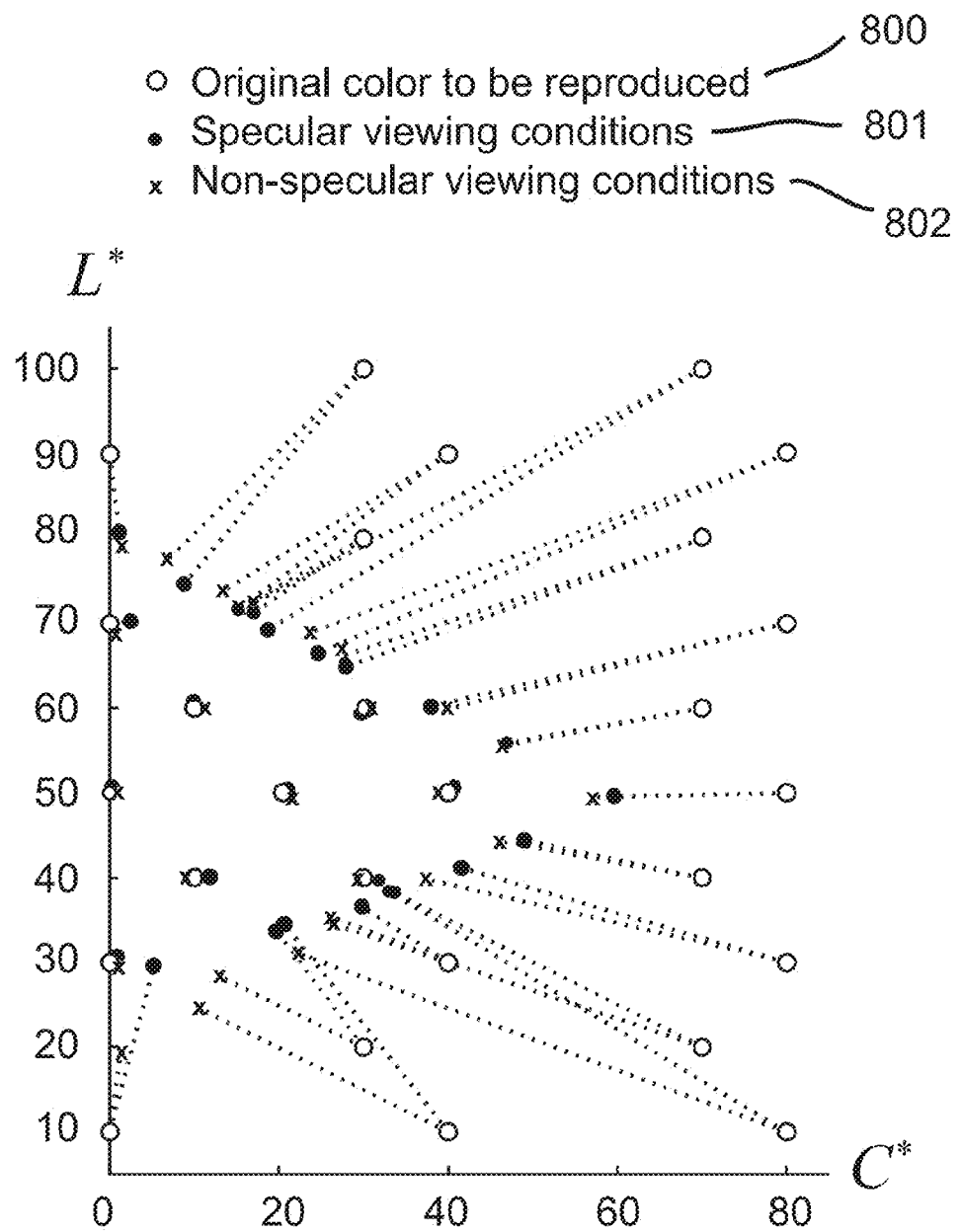
FIG. 8 shows for a particular hue slice the input colors (white circles) and the corresponding colors obtained by fitting the ink surface coverages so as to minimize the difference between input color and printable color simultaneously under both specular (disks) and non-specular (crosses) viewing conditions.

FIG. 8 shows for a particular hue slice ($\alpha = \arctan(b^*/a^*) = 0°$) the input colors (white circles) and the corresponding predicted colors under specular (disks) and non-specular (crosses) viewing conditions after fitting the optimal surface coverages of the inks according to Equation (1). One observes that in each viewing condition, the resulting colors form a new sub-gamut. These new optimal sub-gamuts contain colors that are reproducible under both viewing conditions.

Figure 2:
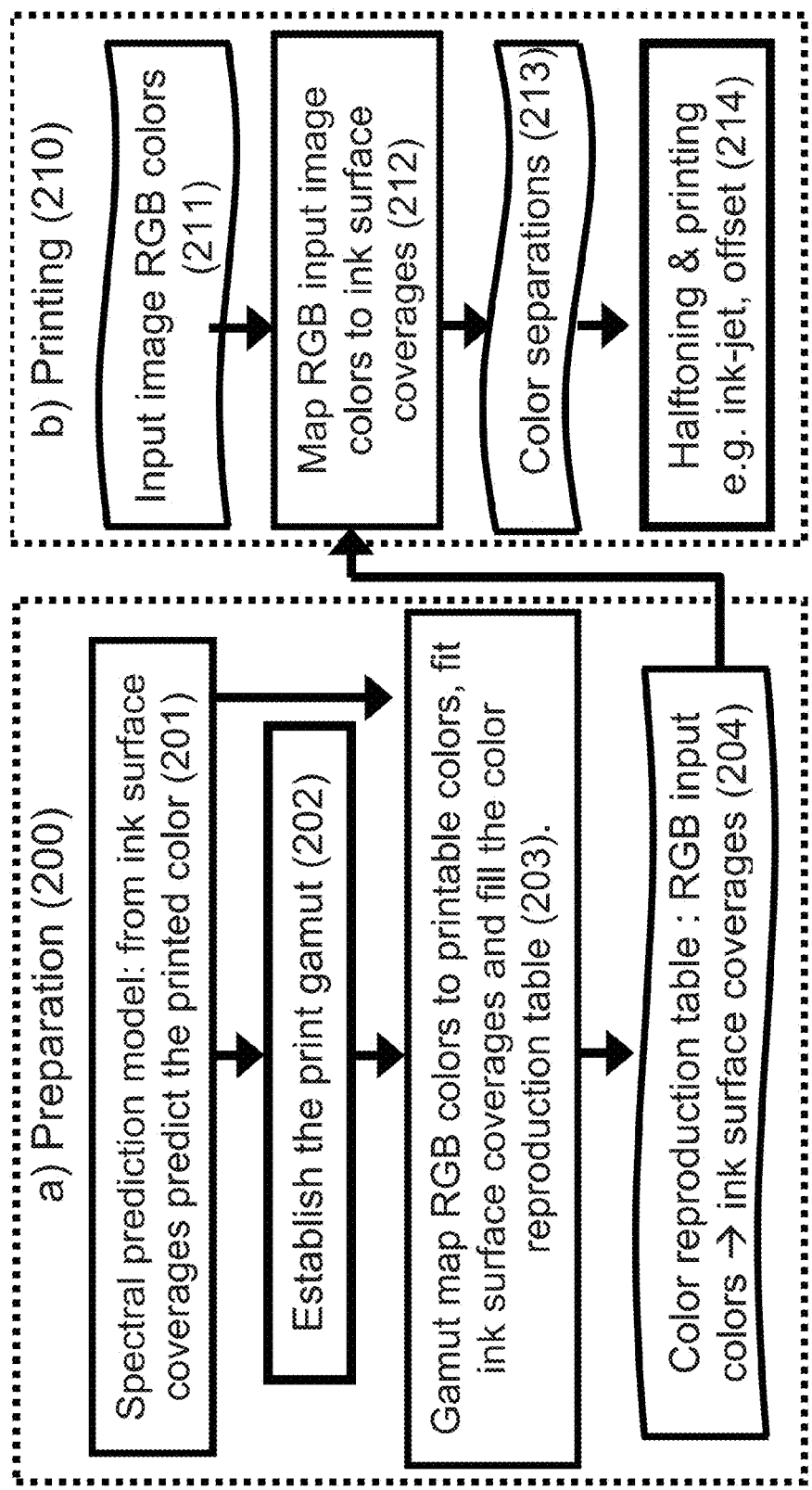
FIG. 2 shows a color reproduction workflow comprising a preparation phase 200 and a printing phase 210.

With the optimal sub-gamuts, we can create according to the workflow of FIG. 2 the color reproduction table mapping RGB input colors to surface coverages of the inks. For this purpose, we first perform gamut mapping, i.e. we map all input colors (RGB) in steps of 5% to printable colors located within the optimal sub-gamuts. Then, these gamut mapped colors $\mathrm{Lab}_{InS}$ and $\mathrm{Lab}_{InNS}$ are used in Equation (1) to obtain the corresponding optimal c,m,y,w ink surface coverages. These c,m,y,w ink surface coverages are inserted at the corresponding entries of the color reproduction table. The gamut mapping step ensures that every reproduced input RGB color can be viewed correctly both under specular and non-specular viewing conditions.

Creating a Color Separation Scheme for Hiding Patterns

Figure 9:
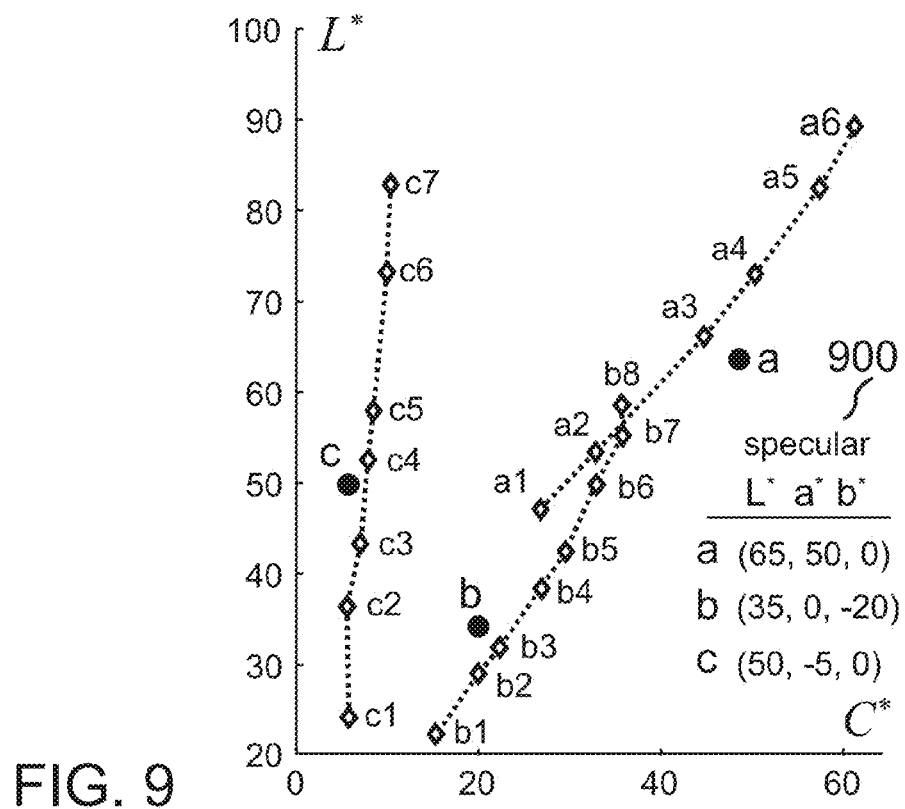
FIG. 9 shows in the lightness-chroma plane, specular colors (large solid disks) in primary viewing mode and the range of corresponding possible non-specular colors (diamonds) in the secondary viewing mode.
Figure 10:
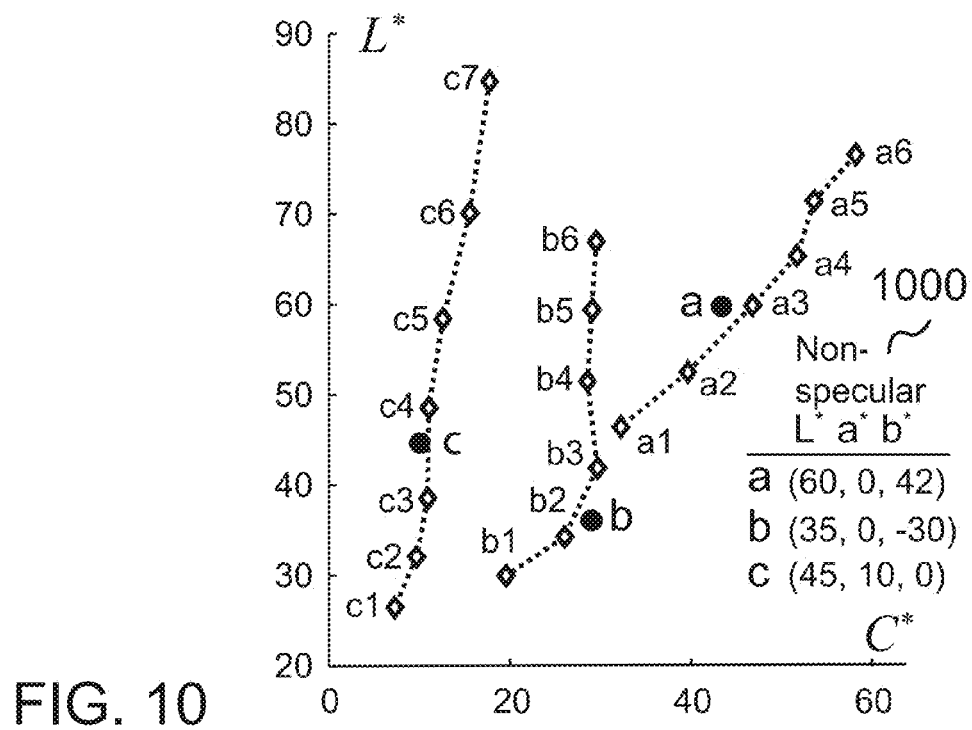
FIG. 10 shows non-specular colors (large solid disks) in the primary viewing mode and the range of corresponding specular colors (diamonds) in the secondary viewing mode.

In addition to the creation of color images that are bright and colorful in both viewing conditions, we would like to hide a pattern such as a text message, a graphic symbol, a logo or possibly a grayscale vignette in one viewing condition (called the primary viewing mode) and reveal it when viewing the same image in the other viewing condition (called the secondary viewing mode). We rely on the fact that a given color in the primary viewing mode can be generated by ink surface coverages producing colors of a similar hue having different lightnesses and chroma in the secondary viewing mode. FIGS. 9 and 10 show that a single color in primary viewing mode (large disk) can be reproduced by many different colors (small connected diamonds) of a similar hue, but having different lightnesses and chroma in the secondary viewing mode. Examples of colors in primary specular and non-specular viewing modes are given as CIELAB values 900 and 1000, respectively.

The idea is to find the gamut of all colors in the primary viewing mode that provides sufficient freedom for relatively large lightness variations in the secondary viewing mode. We call this gamut the "patterning sub-gamut". In specular and non-specular viewing modes, the patterning sub-gamut is formed by a subset of the colors present in the maximal specular and non-specular print gamuts, respectively. This subset of colors is also part of the optimal sub-gamut in the primary viewing mode.

Let us intuitively explain how a constant color can be kept in the primary viewing mode and be modified to match a target lightness in the secondary viewing mode. Increase or decrease in white ink can be compensated by decrease or increase of similar amounts of c,m,y inks Four cases need to be considered: non-specular or specular primary viewing modes, as well as increase or decrease of lightness in the secondary viewing mode.

a) Constant Color in Non-Specular Viewing Mode, Increased Lightness in Specular Viewing Mode To increase the lightness in specular viewing mode, the amount of white ink has to be lowered. Since the bare metal looks very dark in non-specular mode, lowering the amount of white ink darkens the color in non-specular viewing mode. As a compensation, similar amounts of c,m,y inks are to be decreased. This has also the effect of reinforcing the lightness in specular mode.

b) Constant Color in Non-Specular Viewing Mode, Decreased Lightness in Specular Viewing Mode To decrease the lightness in specular viewing mode, the amount of white ink has to be increased. This increases the lightness in non-specular viewing mode. As a compensation, similar amounts of c,m,y inks have to be increased. This also decreases the lightness in specular viewing mode.

c) Constant Color in Specular Viewing Mode, Increased Lightness in Non-Specular Viewing Mode Increasing the amount of white ink increases the lightness in non-specular viewing mode, but decreases the lightness in specular viewing mode. This is compensated by decreasing similar amounts of c,m,y inks. This also increases the lightness in non-specular viewing mode.

d) Constant Color in Specular Viewing Mode, Decreased Lightness in Non-Specular Viewing Mode The amount of white ink has to be lowered. This increases the lightness in specular mode. As a compensation, in order to keep the color constant in primary viewing mode, similar amounts of c,m,y inks have to be increased. This helps also decreasing the lightness in non-specular viewing mode.

In all the four cases described above, the exact ink surface coverages enabling to keep the color constant in the primary viewing mode and to obtain a lightness as close as possible to the modified lightness in the secondary viewing mode are fitted with optimization Equation (2) given below, provided the color in the primary viewing mode is located within the patterning sub-gamut.

Let us formulate the function to be minimized, which in the primary viewing mode hides the patterns by enforcing a given color and in the secondary viewing mode makes them visible.

$$\{c, m, y, w\} = \arg\min_{\{c,m,y,w\}}(\Delta E_{94}(\text{Lab}_{Prim}(c, m, y, w), \text{Lab}_{InPrim}) + \quad (2)$$

$$(L^*_{Sec}(c, m, y, w) - L^*_{TargetSec}))$$

$$\text{such that } \Delta E_{94}(\text{Lab}_{Prim}(c, m, y, w), \text{Lab}_{InPrim}) < 0.5$$

$$\text{and } 0 \le \{c, m, y, w\} \le 1$$

where $\text{Lab}_{InPrim}$ is the input CIELAB color that is to be reproduced in the primary viewing mode, $L^*_{TargetSec}$ is the desired target lightness in the secondary viewing mode, $\text{Lab}_{Prim}(c,m,y,w)$ is the predicted CIELAB color for (c,m,y,w) surface coverages in the primary viewing mode, and $L^*_{Sec}(c,m,y,w)$ is the predicted CIELAB lightness in the secondary viewing mode.

Optimization Equation (2) yields ink surface coverages that provide in the primary mode a printable color $\text{Lab}_{prim}(c,m,y,w)$ as close as possible to the desired color $\text{Lab}_{InPrim}$, but with a maximal distance $\Delta E_{94}<0.5$ and that simultaneously create in the secondary viewing mode a color with a lightness value $L^*_{Sec}(c,m,y,w)$ as close as possible to the desired lightness value $L^*_{TargetSec}$. When the desired input primary color is located inside the patterning sub-gamut, the fitted ink surface coverages yield the desired color in the primary viewing mode and a color in the secondary viewing mode that has a similar hue and a lightness as close as possible to the desired target lightness.

Let us now describe how to create the patterning sub-gamut in the primary viewing mode. We proceed by eliminating from the colors of the considered maximal print gamut the colors in the primary viewing mode whose ink surface coverages do not provide a given minimal range of color variations in the secondary viewing mode, e.g. $\Delta E_{94}=30$. These color variations consist mostly of lightness and chroma variations. Then, the patterning sub-gamut is created by intersecting in the primary viewing mode the volume of the remaining subset of colors offering the desired range of color variations with the volume of the optimal sub-gamut ensuring correct color reproduction in both viewing modes. We carry out this procedure by considering as primary viewing mode the specular mode and then as primary viewing mode the non-specular mode.

Figure 11:
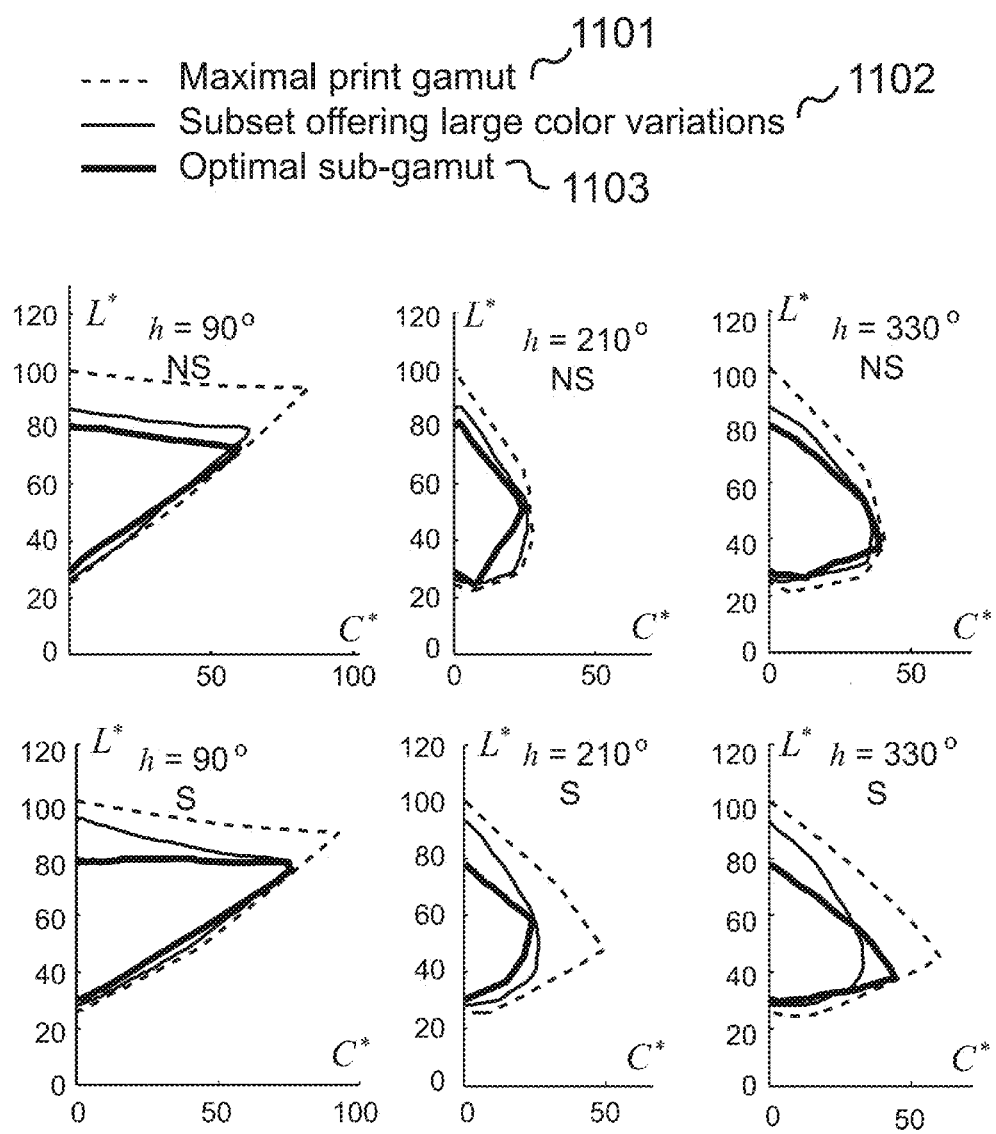
FIG. 11 shows the maximal print gamuts (dashed), the subset of colors offering large color variations (thin) and optimal sub-gamuts enabling printing colors under both viewing conditions (thick), where the top view represents the non-specular gamuts (NS) and the bottom view represents the specular gamuts (S)

FIG. 11 shows for hue slices at hue angles h the maximal print gamuts 1101, the subset of colors offering large color variations 1102 and the optimal sub-gamuts 1103 in the specular (S) and non-specular (NS) viewing modes. The optimal sub-gamuts enable printing colors optimized for viewing them under both viewing conditions.

Since in each viewing mode, the patterning sub-gamut is formed by colors located within the subset of colors offering large lightness variations in the secondary viewing mode and located within the optimal sub-gamut enabling printing accurate colors under both viewing conditions, any color that is located inside the patterning sub-gamut gives good colors under both viewing conditions and has in addition a large lightness modification capability.

Once the patterning sub-gamuts have been created, one creates a reproduction workflow similar to the one of FIG. 1, but modified to include an augmented 4D color reproduction table mapping original RGB values and desired target lightnesses in the secondary viewing mode to ink surface coverages. Desired target lightnesses may be derived from the colors obtained in secondary viewing mode to obtain the best appearance under both viewing conditions (Equation (1)) and from pattern mask values indicating how the lightnesses in secondary viewing mode are to be modified.

Let M(x,y) be the value of the pattern mask at a specific location (x,y) of the image to be reproduced, with $0 \le M(x,y) \le 1$. At 50% mask value, no change is made in the reproduced image, i.e. the target lightness $L^*_{TargetSec}(x,y)$ in the secondary view mode is equal to the lightness that would have been obtained when optimizing the ink surface coverages to obtain the best appearance under both viewing conditions, i.e. $L^*_{TargetSec}(x,y)=L^*_{OptSec}(x,y)$. At a given position (x,y), the desired lightness $L^*_{TargetSec}$ is calculated as a function of mask value M:

$$L^*_{TargetSec}=L^*_{OptSec}+(L^*_{MaxSec}-L^*_{OptSec})((M-0.5)/0.5), M>0.5$$

$$L^*_{TargetSec}=L^*_{OptSec}-(L^*_{OptSec}-L^*_{MinSec})((0.5-M)/0.5), M<0.5 \quad (3)$$

The constant lightnesses $L^*_{MinSec}$ and $L^*_{MaxSec}$ are the minimal and maximal lightnesses of the optimal sub-gamut in the secondary viewing mode. The calculated lightness $L^*_{TargetSec}$ becomes in respect to Equation (2) the desired target lightness. However, since the input lightness $L^*_{OptSec}$ may already be located close to the boundary of the patterning sub-gamut boundary, lightness $L^*_{TargetSec}$ is not necessarily inside that sub-gamut. However, applying Equation (2) will yield the best available solution, i.e. ink surface coverages ensuring that the color in primary viewing mode is the desired color and, in the secondary viewing mode, a lightness value that is as close as possible to the target lightness value, inside the secondary optimal sub-gamut.

Patterns are often created by raising the lightness of the pattern foreground (e.g. mask value 0.75) and by lowering the lightness of the pattern background (e.g. mask value 0.3). Image parts are often enhanced by reducing the lightness of the surrounding parts. This enables keeping the chroma of the enhanced parts.

The augmented 4D color reproduction table is built as follows. For all combinations of input RGB and $L^*_{TargetSec}$ values in steps of 10%, we convert the current RGB color to CIELAB and map it to the primary patterning sub-gamut, obtaining color $\text{Lab}_{InPrim}$. Then, by applying Equation (2)

with the $Lab_{InPrim}$ and $L^*_{TargetSec}$ values, we obtain the corresponding optimal ink surface coverages and store them in the augmented 4D color reproduction table.

During the printing phase, in order to produce the color separations yielding the desired pattern hiding effects, for each input RGB(x,y) image color and each pattern value M(x,y), we carry out the following operations. We first deduce the target lightness $L^*_{TargetSec}$ as follows. We access the color reproduction table, obtain the optimal surface coverages of the inks as a function of the RGB values, predict the corresponding lightness $L^*_{OptSec}$ in the secondary viewing mode and modify it as specified by the pattern mask, according to Equation (3). Then, with the resulting $L^*_{TargetSec}$, the augmented 4D color reproduction table is accessed and the corresponding ink surface coverages are obtained. The resulting cyan, magenta, yellow and white ink layers are halftoned and sent to the printer.

Examples of Hidden Patterns, Enhanced Image Parts and Image Alternations

Hiding and revealing text, graphics and grayscale vignettes or alternating between two grayscale images without significant ghosting effects is only possible under illumination and viewing angles that correspond either to specular or to non-specular viewing conditions. When looking at the print in front of a window under daylight one may observe first the print under specular viewing conditions, and then by tilting the print vertically, observe the print under non-specular viewing conditions.

Figure 12A:
FIGS. 12A and B show the black/white reproduction of a preview of a color print with the message "English Green Tea" hidden in specular viewing mode and revealed in non-specular viewing mode, respectively, where the mask values are set to 0.75 for the message text parts and to 0.32 for the background image, thereby in non-specular mode raising the text lightness and decreasing the background image lightness.
Figure 12B:
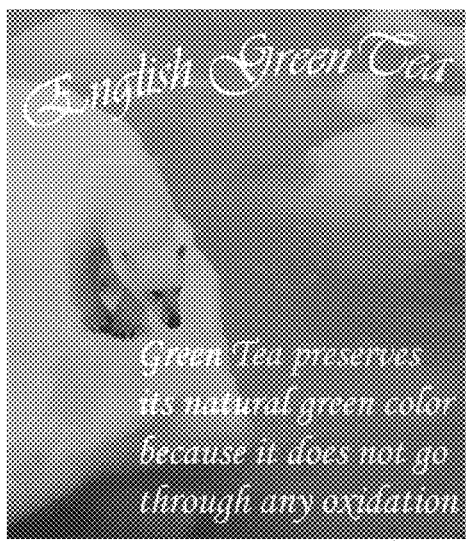

Let us show an example of a message that is hidden in specular viewing mode (FIG. 12A) and appears in the non-specular viewing mode (FIG. 12B). Tilting the printed sample vertically in front of a window makes the text message appear and disappear. Thanks to this dynamic effect, the observing person remembers the text message.

For advertisement purposes, it is often necessary to highlight the presence of an object. Printing with variable amounts of white diffuse ink on a metallic substrate enables enhancing the presence of objects made of metal. For example, the presence of the metallic car 1300 shown in FIG. 13 is enhanced in specular viewing mode by lowering the lightness of the background image (mask value of the background: 0.2).

As an example of a security document, we show an identity card specimen, with two instances of the face of the document holder, one instance appearing under non-specular viewing conditions (FIG. 14A) and the second instance appearing under specular viewing conditions (FIG. 14B). When tilting the card in front of a window or of a light source from non-specular to specular view, the face changes position from left to right. The card is divided into two parts, the right part being viewed as colored background under primary non-specular viewing conditions and as the face image under specular viewing conditions and the left part being viewed as colored background under primary specular viewing condition and as the face image under non-specular viewing conditions. Since the background colors are the same in the left and right parts and despite the fact that the color separations are different, there is no visible boundary between them. The target lightness $L^*_{TargetSec}$ for each pixel in the secondary viewing mode is formed as the lower lightness value between face and background. This enables blending the grayscale face image into the colored background. The lightnesses of the face image are obtained by converting the original achromatic RGB face image to CIELAB and optionally by performing lightness mapping into the lightness range of the optimal gamut in secondary viewing mode.

Since we are free to set a desired lightness in the secondary viewing mode, the patterning mechanism can be used to have a first freely chosen grayscale image in the primary viewing mode and a second independently chosen grayscale image in the secondary viewing mode. Point "c" in FIGS. 9 and 10 shows that achromatic or low-chroma colors in the primary viewing mode can be generated by a large variety of surface coverages of inks that can render nearly any other achromatic or low-chroma color in the secondary viewing mode.

As an illustration, a first grayscale image viewed in specular primary mode flips into a second grayscale image viewed in non-specular secondary mode (FIGS. 15A and 15B, respectively). The target lightnesses of the second grayscale image are obtained in the same manner as the lightnesses of the face image in the previous example. By accessing the augmented 4D color reproduction table with the RGB values of the first grayscale image and the target lightness values derived from the second grayscale image, we obtain the optimal surface coverages of the inks.

Regarding the capability of alternating between a first and a second grayscale image, we show in FIG. 16 that for any lightness $30 < L^*_{Spec} < 80$ in primary specular viewing conditions 1602, and for any lightness $22 < L^*_{NonSpec} < 80$ in primary non-specular viewing conditions 1601, one may generate a very large range of lightnesses in the secondary viewing conditions. For example, a non-specular lightness of $L_{NonSpec}=40$ may be realized by ink surface coverages yielding specular lightnesses between $L^*_{Spec}=24$ and $L^*_{Spec}=96$, see the dashed vertical bar 1603 in FIG. 16. The intuitive explanations about the trade-off between amounts of white and of cyan, magenta and yellow inks given in Section "Creating a color separation scheme for hiding patterns" apply here as well.

Steps for Reproducing "Metallic" Color Images that Provide the Best Appearance Both Under Specular as Well as Under Non-Specular Reflection Conditions The method for reproducing color images on a metallic layer that look good under specular as well as under non-specular reflection comprises the preparation steps described in FIG. 17:

Create and calibrate models for predicting the colors of cyan (c), magenta (m), yellow (y) and white (w) separately under specular and non-specular viewing conditions (1701);

Calculate (1702) the optimal sub-gamuts in specular 1703 and non-specular 1704 viewing modes with the help of Eq. (1) and build their respective hulls;

Map RGB input image colors to the specular and non-specular sub-gamuts, apply Eq. (1) to obtain optimal surface coverages of the c, m, y, w inks (1705) and fill the color reproduction table (1706) creating the correspondence between input image RGB colors and c, m, y, w ink surface coverages providing the best appearance under specular and non-specular viewing conditions.

The printing phase is carried out as shown in FIG. 2, 210, with the classical inks, e.g. cyan, magenta and yellow, and with the white ink.

The inventive element in the present color reproduction workflow consists in considering simultaneously both the specular and non-specular viewing modes and to fit c, m, y, w ink surface coverages by minimizing according to Eq. (1) the difference between desired input colors and printable colors in both the specular and non-specular viewing modes.

It is also possible to print high quality color images on metal with more colored inks than the cyan, magenta, and yellow ink, for example with additional inks selected from the set of light cyan, light magenta, red, green, blue, orange, gray, light gray and black inks. In that case, one may add an additional step during the preparation phase where instead of filling the color reproduction table with c, m, y, w inks only, the color reproduction table is filled with adjusted amounts of c', m', y' inks, of the selected additional inks and of the white (w) ink. The adjusted c', m', y' surface coverages and the surface coverages of the selected inks are computed so as to yield colors under specular and non-specular observations conditions similar to the colors that would have been obtained by printing the corresponding amounts of optimal surface coverages of the c, m, y, w inks.

Steps for Reproducing Color Images with Patterns Hidden Either Under Specular or Under Non-Specular Viewing Conditions (Primary Viewing Mode) and Revealed Under Non-Specular or Specular Viewing Conditions, Respectively, (Secondary Viewing Mode)

In the description that follows we assume that the set of classical inks used for reproducing images with patterns that are hidden under primary viewing conditions and revealed under secondary viewing conditions comprises the cyan, magenta, and yellow inks. However, instead of or in addition to cyan, magenta, and yellow, other chromatic or achromatic inks can be selected, for example inks selected from the set of light cyan, light magenta, red, green, blue, orange, violet, pink, gray and black inks. In the description of methods and computing systems that follows, one may partly or fully replace the cyan (c), magenta (m) and yellow (y) inks by another subset of transparent inks.

The preparation phase comprises two parts. In the first part (FIG. 18), the following steps are carried out:

Create and calibrate models for predicting the colors of cyan (c), magenta (m), yellow (y) and white (w) separately under non-specular and specular viewing conditions (1701);

Build a "surface coverage to color" mapping table creating the correspondence between c, m, y, w surface coverages e.g. in steps of 2% to colors in specular and non-specular modes (1810)

Calculate (1811) the optimal sub-gamuts in specular (1703) and non-specular viewing modes (1704) with the help of Eq. (1) and build their respective hulls;

From the surface coverage to color mapping table, select subsets of surface coverages whose colors are inside the optimal sub-gamut in primary viewing mode and whose neighbouring colors in primary viewing mode provide large lightness differences in secondary viewing mode ($\Delta E_{94} > 30$), see 1817;

Form with these subsets of surface coverages the specular (1820) and non-specular (1821) patterning sub-gamuts and calculate their hulls.

The second part (FIG. 19, left part) of the preparation phase comprises the steps allowing to create the "augmented 4D color reproduction table", that is used for color separation with hidden patterns:

Mapping of the input RGB colors to the patterning sub-gamut to obtain the $Lab_{InPrim}$ gamut mapped colors;

Using these patterning gamut mapped colors as input to the Equation (2), together with the sampled range of possible secondary viewing mode lightnesses $L^*_{TargetSec}$. By solving Eq. (2), obtaining the corresponding surface coverages (1901) and storing them in the augmented 4D color reproduction table 1902.

The printing phase for printing a color image with a hidden message (FIG. 19, right) comprises as input the RGB input image 1911 as well as a pattern mask layer M (1910) incorporating the foreground and background lightness difference values of the hidden message, with the target lightnesses of the message background being lowered and the target lightnesses of the message foreground being increased, or vice-versa. The following steps are carried out:

From the color reproduction table (FIG. 17, 1706), get the optimal surface coverages and with the surface coverage to color table 1810, obtain the colors in secondary mode, whose lightnesses are the lightnesses $L^*_{OptSec}$.

According to the mask values M (x,y) at the current position (x,y), calculate according to formula (3) the target lightnesses $L^*_{TargetSec}$ (x,y), see 1912.

Access the augmented 4D color reproduction table 1902, with the current RGB values and the target lightnesses $L^*_{TargetSec}$, obtain the c, m, y, w surface coverages of the inks (1913). These surface coverages yield the color separations 1914 for printing with the patterns embedded according to the relative lightness differences given in pattern mask M.

Steps for Rendering a Metallic Color Image with Some Image Areas Highlighted in Secondary Viewing Mode The steps are the same as for hiding patterns, described in the previous section, but with the mask values expressing increased lightnesses for the highlighted image areas (FIG. 13, 1300) and/or decreased lightnesses for the remaining non-highlighted image areas. The highlighted image areas in secondary viewing mode enable enhancing specific parts of the image, when seen in the secondary viewing mode. These enhanced parts attract the attention of the observers.

Steps for Producing a Print with Grayscale or Low Chroma Images Alternating in Specular and Non-Specular Viewing Modes The steps are the same as for the color reproduction with hidden patterns, but no mask layer is required. Instead, the second variable intensity (grayscale) image is converted to CIE L* lightness values that are mapped into the lightness range of the optimal sub-gamut in secondary viewing mode. These lightness mapped values, derived from the second variable intensity grayscale image, become the $L^*_{TargetSec}$ values used to access the augmented 4D color reproduction table.

Note that the first image viewable in a primary viewing mode and the second image viewable in secondary viewing mode may be embedded within a metallic color image that shows a high quality appearance both under specular and non-specular observation conditions, i.e. an image that is created with the method steps described in Section "Steps for reproducing metallic color images that provide the best appearance both under specular as well as under non-specular reflection".

Computing System for Reproducing Color Images that Look Good Under Non-Specular as Well as Under Specular Reflection A computing system (FIG. 20) for reproducing color images that look good under specular as well as under non-specular reflection comprises a CPU and memory 2010, at least one disk 2012 and a network interface 2011. This computing system is operable to run software that comprises predefined callable functions. These functions are operable to perform the steps described in Section "Steps for reproducing color images in order to provide the best appearance both under non-specular as well as under specular reflection" and shown in FIG. 17, i.e. functions which in the preparation phase are operable to create and calibrate models for predicting the colors of cyan (c), magenta (m), yellow (y) and white (w) separately under non-specular and specular viewing conditions;

to calculate the optimal sub-gamuts in specular and non-specular viewing modes;

to gamut map RGB input image colors to the optimal specular and non-specular sub-gamuts and to apply Eq. (1) in order to obtain optimal surface coverages of the c, m, y, w inks;

to fill the color reproduction table mapping between input image RGB colors to the previously computed optimal c, m, y, w surface coverages of the inks;

The computing system comprises also functions operable for the printing phase i.e. to create the color separations, to halftone them and to send the halftoned separations to a color printer. The function operable to create the color separations receives as input an RGB color image and accesses the previously filled color reproduction table in order to obtain the optimal cyan, magenta, yellow and white halftone ink surface coverages to create the color separation layers that are then halftoned and printed.

Computing System for Synthesizing Color Images with Hidden Patterns Either Under Specular or Under Non-Specular Viewing Conditions A computing system for reproducing color images with hidden patterns either under specular or under non-specular viewing conditions comprises a CPU, memory, disks and a network interface (FIG. 20) and is operable to run software that comprises callable functions operable to perform the steps described in Section "Steps for reproducing color images with hidden patterns either under specular or under non-specular viewing conditions" and shown in FIGS. 18, 19A and 19B, i.e. functions which in the preparation phase are operable:

to create and calibrate models for predicting the colors of cyan (c), magenta (m), yellow (y) and white (w) separately under non-specular and specular viewing conditions;

to build a "surface coverage to color" mapping table creating the correspondence between c, m, y, w surface coverages of the inks to colors in specular and non-specular modes;

to calculate the optimal sub-gamuts in specular and non-specular viewing modes (1702) with the help of Eq. (1) and to build their respective hulls;

to make use of the surface coverage to color mapping table, to select subsets of surface coverages whose colors are inside the optimal sub-gamut in primary viewing mode and whose neighbouring colors in primary viewing mode provide large lightness differences in secondary viewing mode ($\Delta E_{94} > 30$);

to form with these subsets of surface coverages the patterning non-specular and specular sub-gamut and to calculate their hulls.

The following additional functions enable creating the "augmented 4D color reproduction table", that is used for the color separation with hidden patterns. These functions are operable:

to map the input RGB colors to the patterning sub-gamuts in order to obtain the gamut mapped colors for patterning purposes;

to solve Eq. (2) by using as input the gamut mapped colors for patterning purposes and the secondary viewing mode lightnesses, to obtain the corresponding c, m, y, w surface coverages and to store them in the augmented 4D color reproduction table.

In the printing phase, additional functions create the color separations incorporating the patterns that are hidden in one viewing mode and revealed in the other viewing mode. These functions are operable:

to obtain the optimal c, m, y, w surface coverages of the inks and to derive from the color reproduction table the color in secondary mode, thereby obtaining the secondary mode lightness $L^*_{OptSec}$;

to calculate according to the current mask value M according to formula (3) the target lightness $L^*_{TargetSec}$;

to access the augmented 4D color reproduction table with the current RGB values and the target lightness $L^*_{TargetSec}$ and to obtain the c, m, y, w surface coverages of the inks enabling creating metallic prints hiding the message in one viewing mode, specular or non-specular, and displaying that message in the second viewing mode;

to halftone the color separations created with the c, m, y, w surface coverages of the inks and to send the halftoned color separations to the printer.

Metallic Color Print Hiding Patterns Under Specular or Non-Specular Viewing Conditions Such a metallic color print can be identified by observing it in front of a window or in front of a light source, under specular viewing conditions. If the color image appears without showing the hidden patterns (text, graphics), and if, when slightly tilting the print, the patterns appear under non-specular viewing conditions, the corresponding metallic color print as well as its support can be identified as authentic. In a different configuration, an authentic metallic color print can incorporate patterns that are hidden under non-specular viewing conditions and are revealed under specular viewing conditions. The appearance and disappearance of the pattern message authenticate the metallic print as well as the document or article in which it is integrated or on which it is affixed.

Metallic Color Prints Showing Alternating Grayscale or Low-Chroma Images Under Specular and Non-Specular Viewing Conditions In front of a window or light source, in specular viewing mode, a first grayscale or low-chroma image appears on the metallic surface printed with cyan, magenta, yellow and white inks. Then, upon tilting of this metallic print, a second grayscale or low-chroma image appears. The occurrence of these alternating images identifies the metallic print as authentic.

Embedding Metallic Elements Printed with Transparent Inks, e.g. Cyan, Magenta, Yellow and with a White Diffusing Ink into Security Documents and Valuable Articles Metallic halftone prints formed by a base (FIG. 21, 2004) a metallic foil 2101, possibly an ink attracting transparent layer 2102 and a halftone layer 2103 printed with a white ink and with classical inks, e.g. cyan, magenta, yellow can be incorporated into any document for example within a small place reserved for special effects on opaque paper banknotes, within a polymer banknote or within one of the layers of a laminated plastic card. The metallic color prints can also be placed on the data page of a passport. An identity card may incorporate at two different locations the reduced size image of the document holder that appears and disappears depending on the viewing mode (see FIGS. 14A and 14B and explanations in Section "Examples of hidden patterns, enhanced image parts and image alternations").

The metallic print providing the means to authenticate a valuable article can be part of its package. For example, a package containing drugs may use as a base the metallic color print, possibly coated with a protecting transparent layer. The metallic color print may incorporate an alphanumeric code or a QR-code that disappears and appears, under specular and non-specular viewing conditions, respectively. This code may be used as a further authentication means, by acquiring the photograph of the print with a smartphone, connecting the smartphone to a Web server and verifying that the code (alphanumeric or QR-code) is valid. Another possibility is to print on the metallic sheet the message "ORIGINAL DRUG" hidden in specular viewing mode and revealed in non-specular viewing mode or vice-versa.

Examination and Authentication of a Metallic Print Under a Microscope

As a further means of authentication of prints on metal comprising classical and white ink halftones, a human or an apparatus may examine the metallic print under a microscope, first under non-specular illumination and light capture conditions, e.g. 45° degrees directed incident light and 0° capture orientation (45°:0°). A first halftone structure appears where the white ink dots are bright and where the remaining printed and unprinted metallic halftone parts are dark (e.g. FIG. 22A). Then, by tilting the print under the microscope, one obtains the specular illumination and capture orientations, e.g. the (22.5°:22.5°) specular geometry. Under the specular geometry, the unprinted metal is bright, whereas the white ink dots as well as the classical cyan and magenta ink dots are dark (FIG. 22B). FIG. 22A shows very clearly under the non-specular geometry the "square" grid 2202 formed by the white diffusing ink dot halftones, in the present example nearly horizontal and vertical. FIG. 22B shows portion 2201 of FIG. 22A, under the specular observation geometry. One can verify that a different grid appears, formed by the superposition of the white ink dot "square" grid now displayed as small dark dots 2212 and another grid formed by the dot-on-dot dark appearing classical cyan, magenta and yellow halftones, rotated by 45° degrees in respect to the grid of the white ink halftones. Due to the superposition of the two grids, rosettes 2213 appear. The unprinted metallic parts appear now as bright 2214. The dark part (2203, 2215) of the picture represents the nose of a bear that is dark both under non-specular and specular observation conditions. It therefore does neither have much unprinted white dot surface 2203 nor much unprinted metallic surface 2215. An unprinted white dot surface is a white dot surface on which no other classical ink dots are printed.

Extension of the Presented Methods to Other Ink Colors

The effects that have been described by relying on cyan, magenta, yellow and white inks can also be realized by cyan, magenta and yellow inks, some of them possibly having zero surface coverages, and additional inks such as light cyan, light magenta, gray, light gray, red, green, blue, orange, violet, pink and black inks. In these cases, one may decide that depending on the lightness, the amounts of some of the cyan, magenta and yellow inks are reduced and additional inks are used. This extension may also require to extend the color prediction model in order to predict colors printed with cyan, magenta, yellow and with the additional inks. For more information on printing with additional inks on paper, consult the article by U. Agar, Model Based Color Separation for CMYKcm Printing, Prod. IS&T/SID 9$^{th}$ Color Imaging Conference, pp. 298-302, Scottsdale, November 2001 and the article by Yu. Qu, P. Zitinski Elias and Sa. Gooran, Color prediction modeling for five channel CMYLcLm printing, 2014, Color Imaging XIX: Displaying, Processing, Hardcopy, and Applications, SPIE Vol. 9015, paper 901508, 1-11.

Benefits of the Present Invention

A first benefit relies on the fact that without white ink, cyan, magenta, and yellow prints on metal look colorful under specular viewing conditions, but look dark and colorless under non-specular viewing conditions. The calculation of the optimal surface coverages of the cyan, magenta, yellow and white inks according to Eq.(1) ensures that the corresponding color prints look striking in specular viewing conditions and also good in non-specular viewing conditions. This enables having high quality color prints on metal which look good under a large variety of illuminations, such as those typically found in living-rooms. Printing on metal with the additional optimally computed amount of white ink considerably improves the quality of pictures printed on metallic substrates.

In contrast to many other counterfeit prevention features, metallic prints with hidden patterns or with alternating grayscale or low-chroma images can be authenticated by the naked eye, without requiring additional devices, such as a smartphone, a camera, a scanner or a UV illumination. These metallic prints cannot be counterfeited without the software optimizing the cyan (c), magenta (m), yellow (y), and white (w) ink surface coverages. Without this optimization, strong ghosting effects appear which as a consequence do not allow to hide the patterns in one viewing mode and reveal them in the second viewing mode. In case of alternating images, ghosting has the effect of showing the two images superposed in both viewing modes, specular and non-specular.

Metallic color prints with hidden patterns or alternating images creating surprising effects can be used in amusement parks, for decoration, for art or for advertisements. For example, a large color metallic poster placed at a position where it is illuminated from one side will show to a person walking by first a specular view and then a non-specular view. The metallic poster will display in the first view one image and then in the second view a second independent image. Or it may show in the first view a color image where the message is hidden and in the second view the same image, but with the hidden message revealed. Such effects are induced by the change of position of the observing person. This unexpected succession of views raises the attention of the observer.

For advertisement purposes, a given area (foreground) of a color print on metal may be enhanced by raising its lightness and/or by decreasing the lightness of the surrounding background.

Metallic color prints with hidden patterns or alternating images have a high decorative value and may be used for the decoration of house walls, museum walls, exhibitions, and of goods having a high symbolic value such as cars, watches, jewelry, smartphones, tablets, portable computers, fashion articles, toys, expensive drinks and cosmetic articles.

The invention claimed is:

1. A method for reproducing an input color image on a metallic layer with cyan, magenta, yellow and white inks, said reproduced color image providing a high quality appearance both under specular and non-specular observation conditions, the method comprising a preparation and a printing phase, where the preparation phase comprises the steps of:
   (i) creating and calibrating models for predicting colors obtainable with known surface coverages of cyan (c), magenta (m), yellow (y) and white (w) ink halftones under both specular and non-specular viewing conditions;
   (ii) computing optimal sub-gamuts under the specular and the non-specular viewing conditions containing colors that are printable and that provide the closest distance to input colors, both under the specular and the non-specular viewing conditions;

(iii) mapping input RGB colors to the optimal specular and non-specular sub-gamuts, obtaining optimal surface coverages of the c, m, y, w inks by minimizing the distances between said mapped colors and printable colors both under the specular and the non-specular viewing conditions and filling a color reproduction table creating a correspondence between said input RGB colors and said optimal surface coverages of the c, m, y, w inks; said minimization of distances between said mapped and said printable colors providing the high-quality appearance under both the specular and the non-specular viewing conditions;

and where the printing phase comprises the steps of (a) obtaining from input image RGB colors by accessing said color reproduction table the c, m, y, w ink surface coverages providing the high-quality appearance under both the specular and the non-specular viewing conditions and creating with said optimal c, m, y, w ink surface coverages cyan, magenta, yellow and white color separation layers;

(b) halftoning said color separation layers and sending them to the printer.

2. The method of claim 1, where said models for predicting colors comprise one model that is calibrated to predict colors under specular observation conditions and another model that is calibrated to predict colors under non-specular observation conditions, and where said models are extensions of an ink-spreading enhanced Yule-Nielsen modified Neugebauer spectral prediction model.

3. The method of claim 1, where the colors that are printable and that provide the closest distance to the desired colors are colors $Lab_{Spec}(c,m,y,w)$ under the specular and colors $Lab_{NonSpec}(c,m,y,w)$ under the non specular observation conditions, said colors $Lab_{Spec}(c,m,y,w)$ and $Lab_{NonSpec}(c,m,y,w)$ being obtained by fitting optimal surface coverages c, m, y, w of the inks according to the following equation:

$$\{c,m,y,w\}=\mathrm{argmin}[\Delta E_{94}(Lab_{Spec}(c,m,y,w),Lab_{InS})+\Delta E_{94}(Lab_{NonSpec}(c,m,y,w),Lab_{InNs})]$$

Subject to $0 \leq \{c,m,y,w\} \leq 1$,
where $Lab_{InS}$ and $Lab_{InNS}$ are input colors that are to be reproduced under the specular and non-specular viewing conditions, respectively, and where $\Delta E_{94}$ is a distance metric between two colors defined in the CIELAB color space.

4. The method of claim 1, where further additional inks are selected from the set of light cyan, light magenta, gray, light gray, red, green, blue, orange, violet, pink and black inks and where an additional step is carried out in order to decompose the optimal c, m, y, w ink surface coverages into adjusted c', m', y' surface coverages, surface coverages of the additional inks and surface coverage of the white ink (w') yielding colors under specular and non-specular observations conditions that are substantially similar to the colors that are obtained both under specular and non-specular observations conditions when printing with the optimal c, m, y, w ink surface coverages.

5. A method for reproducing on a metallic layer with classical inks and with a white ink a first image viewable in a primary viewing mode, specular or non-specular, and a second image viewable in secondary viewing mode, non-specular or specular, respectively, where the classical inks are selected from the set of cyan, magenta, yellow, light cyan, light magenta, red, green, blue, orange, violet, pink, gray and black inks, where the second image has selectable desired target lightness values, the method comprising a first preparation phase, a second preparation phase and a printing phase, where the first preparation phase comprises the steps of:

(i) creating and calibrating models for predicting colors obtainable with known surface coverages of the classical and the white ink halftones both under specular and non-specular viewing conditions;

(ii) building a "surface coverage to color" table creating the correspondence between classical and white ink surface coverages and colors appearing under specular and non-specular viewing conditions;

(iii) calculating optimal sub-gamuts in specular and non-specular viewing modes containing colors that are printable and that provide the closest distance to desired colors, both under specular and non-specular viewing conditions;

(iv) from the surface coverage to color table, selecting subsets of surface coverages whose colors are inside the optimal sub-gamut in primary viewing mode and whose close neighbour colors in primary viewing mode provide large lightness differences in secondary viewing mode;

(v) creating with these subsets of surface coverages the patterning specular and non-specular sub-gamuts;

where the second preparation phase aims at building an augmented 4D color reproduction table and comprises the steps of:

(vi) mapping of input RGB colors to the patterning sub-gamut to obtain colors mapped to the patterning sub-gamut;

(vii) with said colors mapped to the patterning sub-gamut and with target lightnesses selected in the range between low and high target lightnesses in the secondary viewing mode, fitting patterning surface coverages of the classical and white inks to obtain simultaneously colors in primary viewing mode close to the colors mapped into the patterning sub-gamut and lightnesses in secondary viewing mode as close as possible to said target lightnesses, and storing said patterning surface coverages of inks into the augmented 4D color reproduction table at the entries defined by the corresponding input RGB colors and by the target lightnesses in secondary viewing mode; and where the printing phase comprises the steps of:

(a) accessing said augmented 4D color reproduction table with input image RGB values defining the first image in the primary viewing mode and with the desired target lightnesses defining the second image in the secondary viewing mode, obtaining the patterning surface coverages of the classical and the white inks, and creating with the patterning ink surface coverages color separation layers for the classical inks and the white ink;

(b) halftoning said color separation layers and sending them to the printer.

6. The method of claim 5 applied for reproducing color images on a metallic layer where the second color image appearing in secondary viewing mode is similar to the first color image appearing in the primary viewing mode, but whose lightnesses within selected areas differ from the lightnesses of the first color image, the lightness differences being defined by mask values, where the preparation phase comprises also the creation of a color reproduction table obtained by the step of (α) mapping input RGB colors to the optimal specular and non-specular sub-gamuts, obtaining optimal surface coverages of the classical inks and the white ink by minimizing the distances between said mapped colors and printable colors under both specular and non-specular viewing conditions and filling a color reproduction table mapping said input RGB colors to classical and white ink surface coverages providing the best color appearance under both specular and non-specular viewing conditions;

and where the printing phase is an extended printing phase comprising also the steps of:

(β) accessing the color reproduction table, getting the optimal surface coverages of the classical and white inks and with the surface coverage to color table, obtain the color in secondary mode, whose lightness is $L^*_{OptSec}$;

(γ) according to the lightness differences expressed by the mask values, calculating with the lightness $L^*_{OptSec}$ a target lightness $L^*_{TargetSec}$ used for accessing the augmented 4D color reproduction table and obtaining the patterning surface coverages of the classical and white inks.

7. The method of claim 6, where the lightness differences between the first and the second image defined by the mask values create patterns, said patterns being selected from the set of alphanumerical signs, text, graphical symbols and variable intensity pictures.

8. The method of claim 6, where said lightness differences between the first and the second image defined by the mask values enhance in the second image the selected areas of the first image by raising their lightnesses and/or by decreasing the lightnesses of surrounding areas.

9. The method of claim 5 where the first image and the second image are substantially variable intensity images that appear alternately when tilting the print from specular to non-specular viewing mode and vice-versa, where the input image is the first image of the alternating images and where the second image of the alternating images is given as a substantially grayscale image, whose intensity values define the lightness values $L^*_{TargetSec}$ to access the augmented 4D color reproduction table and obtain the patterning surface coverages of the classical inks and of the white ink enabling creating the color separation layers for halftoning and printing.

10. The method of claim 5, where the first image viewable in a primary viewing mode and the second image viewable in secondary viewing mode are embedded within a metallic color image that shows a high quality appearance both under specular and non-specular observation conditions.

11. A computing system for reproducing color images on a metallic layer that look good under non-specular as well as under specular observation conditions comprises a CPU, memory, disks and a network interface and runs software that comprises predefined callable software functions, which in the preparation phase are operable:

to create and calibrate models for predicting the colors obtainable with known surface coverages of classical and white ink halftones, separately under specular and under non-specular viewing conditions;

to calculate optimal sub-gamuts in specular and non-specular viewing modes whose colors are printable and are closest to the desired colors, both under specular and non-specular viewing conditions;

to gamut map input RGB colors to the optimal specular and non-specular sub-gamuts and to minimize a distance between said gamut mapped colors and printable colors achievable in both viewing modes in order to obtain the optimal surface coverages of the classical and white inks;

to fill a color reproduction table creating the correspondence between the input RGB colors and said optimal surface coverages of the inks;

and which in the printing phase are operable:

to access with RGB image colors said color reproduction table and obtain optimal surface coverages of the classical and white inks;

with said optimal surface coverages, to create the color separations of white and classical ink layers, to halftone them and to send the halftoned color separations to a printer.

12. The computing system of claim 11, enhanced with additional functions operable for creating prints on metal that show a first image in a primary viewing mode, specular or non-specular, and a second image viewable in the secondary viewing mode, non-specular or specular, respectively, said functions being in a first preparation phase operable to:

build a "surface coverage to color" table creating the correspondence between surface coverages of classical and white inks and colors in specular and non-specular viewing modes;

select from the surface coverage to color table subsets of surface coverages whose colors are inside the optimal sub-gamut in primary viewing mode and whose close neighbour colors in primary viewing mode provide large lightness differences in secondary viewing mode;

form with these subsets of surface coverages the patterning specular and non-specular sub-gamuts;

being in a second preparation phase operable:

to map input RGB colors to the patterning sub-gamut to obtain patterning gamut mapped colors;

with said patterning gamut mapped colors and with target lightnesses selected in the range from low to high target lightnesses in the secondary viewing mode, to fit patterning surface coverages of the classical and white inks to obtain colors in primary viewing mode close to the patterning gamut mapped colors and lightnesses in secondary viewing mode as close as possible to said target lightnesses, and storing said patterning surface coverages of inks into an augmented 4D color reproduction table at the entries defined by the corresponding input RGB colors and by the target lightnesses in secondary viewing mode;

and being in a printing phase operable:

to access said augmented 4D color reproduction table with the RGB values of the first image and with target lightnesses $L^*_{TargetSec}$ derived from the image in the secondary viewing mode, obtain the patterning surface coverages of the classical and white inks, and create with said patterning ink surface coverages the classical and white color separation layers used for subsequent halftoning and printing.

13. The computing system of claim 12, where the first image viewable in primary viewing mode is an input RGB color image and where the second image viewable in secondary viewing mode is a substantially similar color image, but with an additional visual element, where the additional visual element is defined as lightness differences specified by mask values, and where the printing phase is an extended printing phase with additional functions operable to:

access the color reproduction table with the input RGB color image values, get the optimal surface coverages of the classical and white inks, access the surface coverage to color table with the optimal surface coverages of the inks to obtain the colors in secondary mode whose lightnesses are named $L^*_{OptSec}$;

according to lightness differences expressed by the mask values, calculate with lightnesses $L^*_{OptSec}$ the target lightnesses $L^*_{TargetSec}$ used for accessing, together with the input RGB color image values, the augmented 4D color reproduction table and obtaining the surface coverages of the classical and white inks enabling creating the color separations used for subsequent halftoning and printing.

14. The computing system of claim 13, where the additional visual element is selected from the set of text message, graphical message and of image areas that are highlighted.

15. The computing system of claim 12, where the first image viewable in primary viewing mode is a substantially grayscale image and where the second image viewable in secondary viewing mode is an independent substantially grayscale image whose intensity values define the CIELAB lightness values used as $L^*_{TargetSec}$ lightness values to access, with the first grayscale RGB image values, the augmented 4D color reproduction table and obtain the $c_p$, $m_p$, $y_p$, and $w_p$ patterning surface coverages of the inks enabling creating the color separation layers used for subsequent halftoning and printing.

16. A halftone print on a metallic surface comprising classical ink halftones and white ink halftones showing, when viewed under primary viewing conditions, specular or non-specular, a first picture and when viewed under secondary viewing conditions, non-specular or specular, respectively, a second picture, and that, when tilting the print back and forth between primary and secondary viewing conditions, shows the first picture and the second picture in alternance.

17. The metallic halftone print of claim 16, where the classical ink halftones are cyan, magenta and yellow halftones, where the first picture is a color image with a pattern that is hidden, where the second picture is substantially similar to the first picture, but with said pattern revealed.

18. The metallic halftone print of claim 16, where the first picture is a substantially gray image and the second picture is also a substantially gray image, but different from the first gray image.

19. The metallic halftone print of claim 16, where a detailed examination at a specific location of the print under a microscope reveals one halftone structure under specular illumination and observation conditions and at the same location another halftone structure under non-specular illumination and observation conditions.

20. The metallic halftone print of claim 17, where said pattern forms a recognizable message, selected from the set of text, numbers, graphical symbols, typographical characters, numerals, logos, and spatial codes.

21. The metallic halftone print of claim 20, where said pattern is acquired by the camera of a portable computing device, where the message formed by the pattern is recognized and sent to a remote server for authentication.

22. The metallic halftone print of claim 16 integrated into an item selected from the set of security documents and valuable articles, where the set of security documents and valuable articles comprises bank notes, passports, identity cards, entry tickets, travel documents, checks, vouchers, valuable business documents as well as CDs, DVDs, software packages, medical drugs, watches, bottles, personal care articles, fashion articles, cars, clothes, posters, publicity displays and items of commercial art.

23. The metallic halftone print of claim 16 placed on a surface selected from the set of wall surfaces and surfaces of goods having a high symbolic value, the wall surfaces being selected from the set of living room walls, house walls, museum walls, and exhibition walls, and the goods having a high symbolic value being selected from the set of cars, watches, jewelry, smartphones, tablets, portable computers, fashion articles, toys, expensive drinks and cosmetic articles.

\* \* \* \* \*